US012728767B2

(12) United States Patent
Niizuma

(10) Patent No.: US 12,728,767 B2
(45) Date of Patent: Sep. 8, 2026

(54) VEHICLE POWER SUPPLY SYSTEM

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 740 days.

(21) Appl. No.: 17/894,522

(22) Filed: Aug. 24, 2022

(65) Prior Publication Data

US 2023/0142515 A1 May 11, 2023

(30) Foreign Application Priority Data

Nov. 11, 2021 (JP) ................................ 2021-183918

(51) Int. Cl.

*B60L 58/26* (2019.01)
*B60L 50/64* (2019.01)
*B60L 53/12* (2019.01)
*B60L 58/12* (2019.01)
*F25B 30/02* (2006.01)
*F25B 39/00* (2006.01)

(52) U.S. Cl.

CPC ............... *B60L 58/26* (2019.02); *B60L 50/64* (2019.02); *B60L 53/12* (2019.02); *B60L 58/12* (2019.02); *F25B 30/02* (2013.01); *F25B 39/00* (2013.01)

(58) Field of Classification Search

CPC .. F24D 11/0278; F24D 2200/29; B60L 53/12; B60L 50/64; B60L 53/30; B60L 58/12; B60L 2240/545; B60L 53/302; B60L 53/305; B60L 53/32; F25B 30/02; F25B 39/00; F25B 1/00; E04H 6/00; E04H 6/08

See application file for complete search history.

(56) References Cited

U.S. PATENT DOCUMENTS 11,499,757 B2 * 11/2022 Kozasa ................ F28D 1/0461
2017/0094947 A1 * 4/2017 Greer ........................ E04H 6/02
2019/0118692 A1 * 4/2019 Qiu ......................... B60L 50/50
2019/0346095 A1 * 11/2019 Brown .................... F21V 23/06
2020/0009977 A1 * 1/2020 Park ....................... B60L 53/35

(Continued)

FOREIGN PATENT DOCUMENTS

CN 113525111 A * 10/2021 ............. B60L 53/38
EP 3686506 A1 7/2020

(Continued)

OTHER PUBLICATIONS

Pdf is original document of foreign reference EP 3988870 A1 (Year: 2022).*

(Continued)

*Primary Examiner* — Paul Alvare
*Assistant Examiner* — Kamran Tavakoldavani
(74) *Attorney, Agent, or Firm* — Volpe Koenig

(57) ABSTRACT

A vehicle power supply system for supplying power to a vehicle includes a power supply unit, and a heat supply unit configured to recover heat and supply the recovered heat to an object to be supplied with heat. The power supply unit includes a storage part configured to store the vehicle, and a power supply part configured to supply power to the vehicle stored in the storage part. The heat supply unit includes a heat recovery part configured to recover heat inside the storage part, and a heat release part configured to release the recovered heat to the object to be supplied with heat.

9 Claims, 18 Drawing Sheets

(56) References Cited

U.S. PATENT DOCUMENTS

| | | | | |
|---|---|---|---|---|
| 2020/0141174 | A1* | 5/2020 | Herman | B60L 53/305 |
| 2021/0152019 | A1 | 5/2021 | Akihiro, II | |
| 2022/0094189 | A1* | 3/2022 | Sandahl | B60L 53/14 |

FOREIGN PATENT DOCUMENTS

| | | | | | |
|---|---|---|---|---|---|
| EP | 3988870 | A1 | * | 4/2022 | B65D 81/18 |
| JP | 2009-143509 | A | | 7/2009 | |
| JP | 2011038365 | A | * | 2/2011 | |
| JP | 2013-134033 | A | | 7/2013 | |
| JP | 2014-149950 | A | | 8/2014 | |
| JP | 2015-216723 | A | | 12/2015 | |
| JP | 2019-215139 | A | | 12/2019 | |
| JP | 2019-219107 | A | | 12/2019 | |
| JP | 2021-083146 | A | | 5/2021 | |

OTHER PUBLICATIONS

Pdf is translation of foreign reference CN-113525111-A (Year: 2021).*

Pdf is translation of foreign reference JP-2011038365-A (Year: 2011).*

* cited by examiner

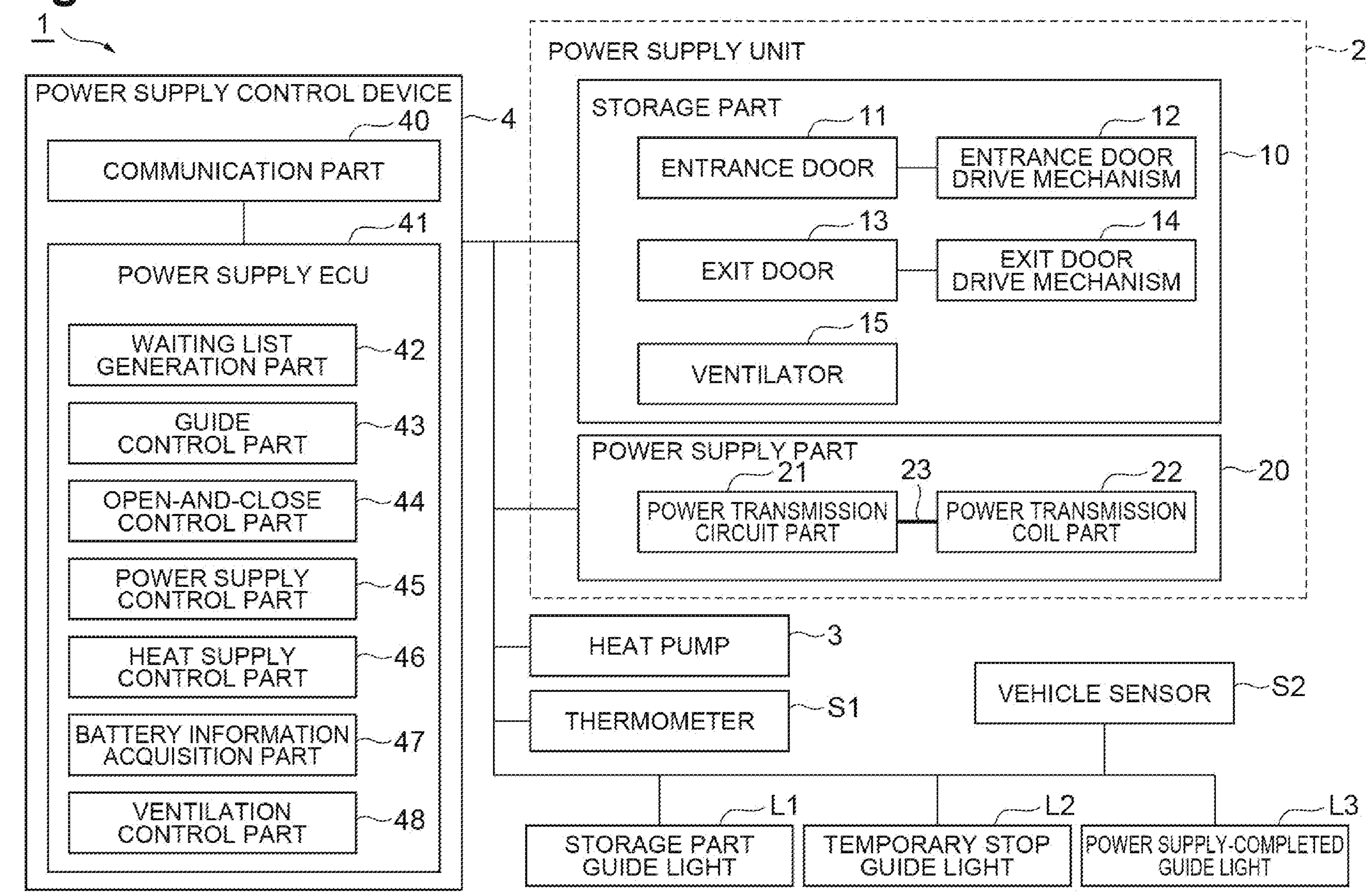
Fig.2
1
POWER SUPPLY CONTROL DEVICE
4
COMMUNICATION PART
40
POWER SUPPLY ECU
41
WAITING LIST GENERATION PART
42
GUIDE CONTROL PART
43
OPEN-AND-CLOSE CONTROL PART
44
POWER SUPPLY CONTROL PART
45
HEAT SUPPLY CONTROL PART
46
BATTERY INFORMATION ACQUISITION PART
47
VENTILATION CONTROL PART
48
POWER SUPPLY UNIT
2
STORAGE PART
10
ENTRANCE DOOR
11
ENTRANCE DOOR DRIVE MECHANISM
12
EXIT DOOR
13
EXIT DOOR DRIVE MECHANISM
14
VENTILATOR
15
POWER SUPPLY PART
20
POWER TRANSMISSION CIRCUIT PART
21
23
POWER TRANSMISSION COIL PART
22
HEAT PUMP
3
THERMOMETER
S1
VEHICLE SENSOR
S2
STORAGE PART GUIDE LIGHT
L1
TEMPORARY STOP GUIDE LIGHT
L2
POWER SUPPLY-COMPLETED GUIDE LIGHT
L3

15
10b
R,P
V
53
52
BATTERY
POWER RECEPTION CIRCUIT PART
51
22
10
10c
13
23
31
21
3
K
T
33

V
5
CHARGING UNIT
53
BATTERY
52
POWER RECEPTION CIRCUIT PART
51
POWER RECEPTION COIL PART
6
CHARGE CONTROL DEVICE
60
COMMUNICATION PART
61
CHARGE ECU
62
CHARGE CONTROL PART
63
BATTERY INFORMATION TRANSMISSION PART
7
AUTONOMOUS DRIVING DEVICE
71
CAMERA

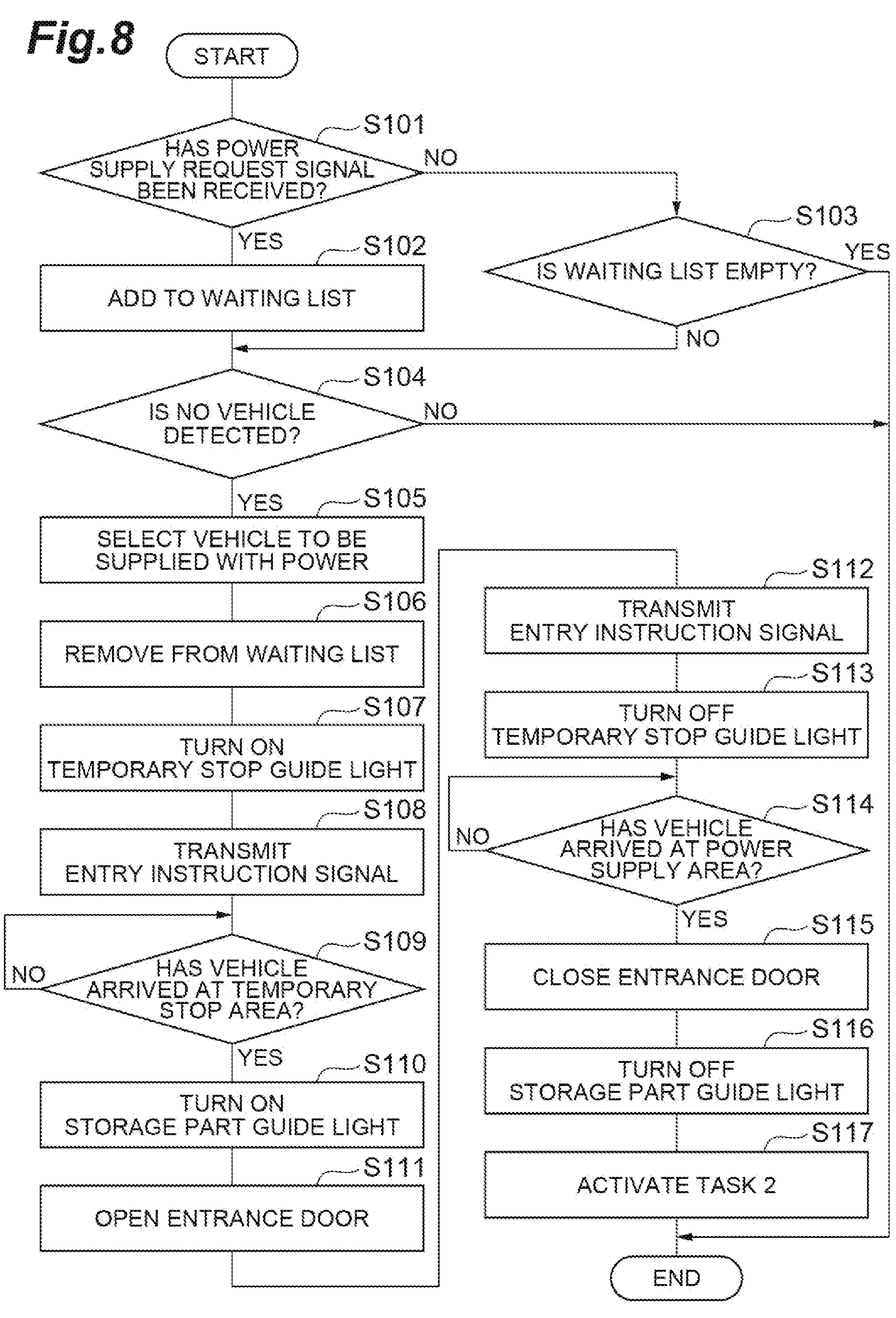
Fig.8
START
S101
HAS POWER SUPPLY REQUEST SIGNAL BEEN RECEIVED?
NO
YES
S102
ADD TO WAITING LIST
S103
IS WAITING LIST EMPTY?
YES
NO
S104
IS NO VEHICLE DETECTED?
NO
YES
S105
SELECT VEHICLE TO BE SUPPLIED WITH POWER
S106
REMOVE FROM WAITING LIST
S107
TURN ON TEMPORARY STOP GUIDE LIGHT
S108
TRANSMIT ENTRY INSTRUCTION SIGNAL
S109
HAS VEHICLE ARRIVED AT TEMPORARY STOP AREA?
NO
YES
S110
TURN ON STORAGE PART GUIDE LIGHT
S111
OPEN ENTRANCE DOOR
S112
TRANSMIT ENTRY INSTRUCTION SIGNAL
S113
TURN OFF TEMPORARY STOP GUIDE LIGHT
S114
HAS VEHICLE ARRIVED AT POWER SUPPLY AREA?
NO
YES
S115
CLOSE ENTRANCE DOOR
S116
TURN OFF STORAGE PART GUIDE LIGHT
S117
ACTIVATE TASK 2
END

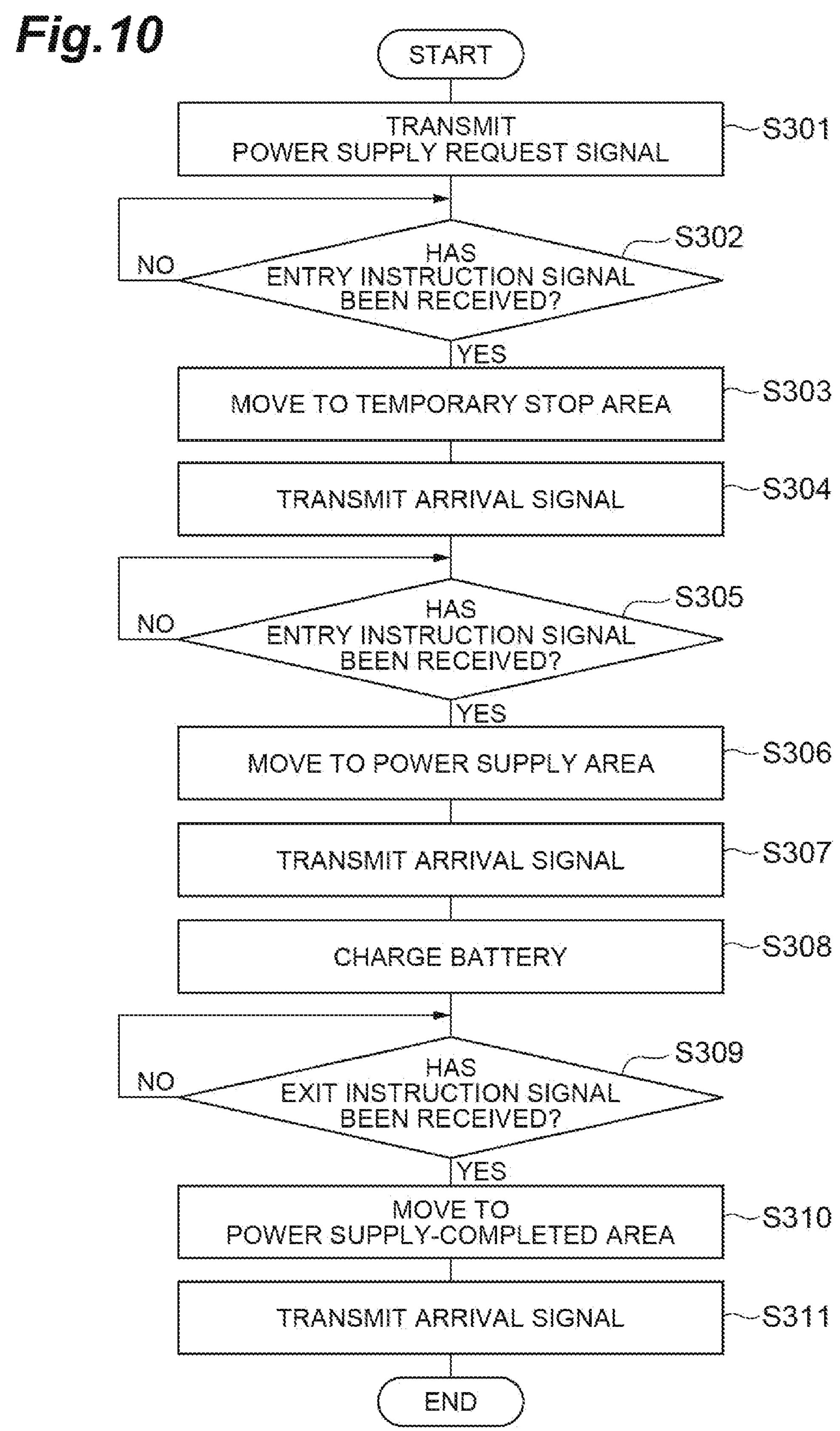
Fig.10
START
TRANSMIT POWER SUPPLY REQUEST SIGNAL
S301
HAS ENTRY INSTRUCTION SIGNAL BEEN RECEIVED?
S302
NO
YES
MOVE TO TEMPORARY STOP AREA
S303
TRANSMIT ARRIVAL SIGNAL
S304
HAS ENTRY INSTRUCTION SIGNAL BEEN RECEIVED?
S305
NO
YES
MOVE TO POWER SUPPLY AREA
S306
TRANSMIT ARRIVAL SIGNAL
S307
CHARGE BATTERY
S308
HAS EXIT INSTRUCTION SIGNAL BEEN RECEIVED?
S309
NO
YES
MOVE TO POWER SUPPLY-COMPLETED AREA
S310
TRANSMIT ARRIVAL SIGNAL
S311
END X
10A
10c
10b
R,P
13
V
53
BATTERY
52
POWER RECEPTION
CIRCUIT PART
51
22
23
31
21
3
K
33
T

VEHICLE POWER SUPPLY SYSTEM

CROSS-REFERENCE TO RELATED APPLICATIONS

This application claims the benefit of priority from Japanese Patent Application No. 2021-183918, filed on Nov. 11, 2021, the entire contents of which are incorporated herein by reference.

TECHNICAL FIELD

The present disclosure relates to a vehicle power supply system that supplies power to vehicles.

BACKGROUND

Traditionally, there have been systems for charging batteries of vehicles such as electric vehicles. When charging these batteries, heat is generated in the batteries and the like. Thus, for example, Japanese Unexamined Patent Application No. 2009-143509 A discloses a system for recovering and using the heat generated by a battery. In this system, heat is recovered from a vehicle by connecting, to the vehicle, a conduit that draws air warmed by the battery.

SUMMARY

In such a system for supplying power (supplying electric power) to vehicles, it is required that the generated heat be recovered and used more efficiently. It is thus an object of the present disclosure to provide a vehicle power supply system that is capable of effectively recovering and using heat that is generated during power supply to a vehicle.

One aspect of the present disclosure is a vehicle power supply system for supplying power to a vehicle, including a power supply unit configured to supply power to the vehicle, and a heat supply unit configured to recover heat and supply the recovered heat to an object to be supplied with heat, wherein the power supply unit includes a storage part configured to store the vehicle, and a power supply part configured to supply power to the vehicle stored in the storage part, and wherein the heat supply unit includes a heat recovery part installed inside the storage part, and configured to recover heat inside the storage part, a heat release part installed outside the storage part, and configured to release the heat recovered by the heat recovery part to the object to be supplied with heat, and a heat transfer mechanism configured to transfer the heat recovered by the heat recovery part to the heat release part.

BRIEF DESCRIPTION OF DRAWINGS

FIG. 2 is a block diagram illustrating a configuration of the vehicle power supply system.

FIG. 8 is a flow chart illustrating the flow of task 1 of a power supply process performed by a power supply control device.

FIG. 10 is a flow chart illustrating the flow of a charging process performed by the vehicle.

DETAILED DESCRIPTION

Figure 1:
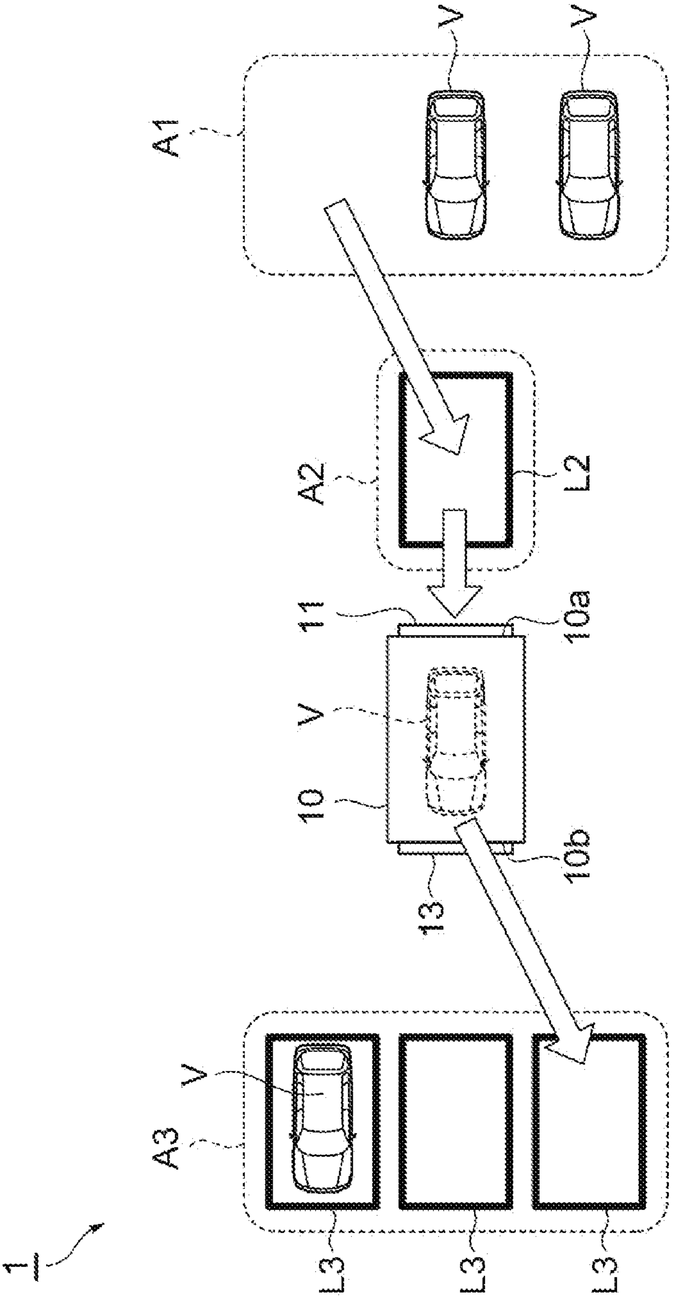
FIG. 1 is a plan view illustrating a layout in a configuration relating to the movement of a vehicle in a vehicle power supply system according to an embodiment.

One aspect of the present disclosure is a vehicle power supply system for supplying power to a vehicle, including a power supply unit configured to supply power to the vehicle, and a heat supply unit configured to recover heat and supply the recovered heat to an object to be supplied with heat, wherein the power supply unit includes a storage part configured to store the vehicle, and a power supply part configured to supply power to the vehicle stored in the storage part, and wherein the heat supply unit includes a heat recovery part installed inside the storage part, and configured to recover heat inside the storage part, a heat release part installed outside the storage part, and configured to release the heat recovered by the heat recovery part to the object to be supplied with heat, and a heat transfer mechanism configured to transfer the heat recovered by the heat recovery part to the heat release part.

In this vehicle power supply system, the space inside and outside the storage part can be separated by having the storage part for storing the vehicle. The vehicle power supply system is thus capable of keeping heat generated during power supply to the vehicle within the storage part, and efficiently recovering the heat inside the storage part by the heat recovery part. The vehicle power supply system is then capable of transferring the recovered heat to the heat release part, and supplying the heat to the object to be supplied with heat from the heat release part. Thus, the vehicle power supply system is capable of efficiently recovering and using the heat generated during power supply to the vehicle.

In the vehicle power supply system, the heat transfer mechanism may include a heat transfer medium configured to move between the heat recovery part and the heat release part, the heat recovery part may be configured to transmit the heat inside the storage part to the heat transfer medium, and the heat release part may be configured to release the heat of the heat transfer medium to the object to be supplied with heat. In this case, the heat supply unit is capable of supplying the heat inside the storage part to the object to be supplied with heat by transferring the heat transfer medium from the heat recovery part to the heat release part.

In the vehicle power supply system, the heat supply unit may be a heat pump configured to perform a heat cycle including an evaporation step, a compression step, and a condensation step of a heat transfer medium to transfer the heat to be supplied to the object to be supplied with heat, the heat recovery part may include an evaporator configured to perform the evaporation step of recovering the heat inside the storage part and evaporating the heat transfer medium, the heat transfer mechanism may include a pipe configured to transfer the heat transfer medium from the heat recovery part to the heat release part, and a compressor configured to perform the compression step of compressing the heat transfer medium evaporated by the evaporator and raising a temperature of the heat transfer medium, and the heat release part may include a condenser configured to perform the condensation step of releasing the heat from the heat transfer medium of which the temperature has been raised by the compressor to the object to be supplied with heat and condensing the heat transfer medium. In this case, the vehicle power supply system is capable of more efficiently recovering the heat inside the storage part and supplying the same to the object to be supplied with heat using the heat pump being the heat supply unit even when the temperature of the object to be supplied with heat is higher than the temperature inside the storage part.

In the vehicle power supply system, the heat recovery part may be installed in a position closer to a ceiling of the storage part than to a floor surface of the storage part. Warm air tends to accumulate in an upper position inside the storage part. Thus, in the vehicle power supply system, the heat inside the storage part can be more efficiently recovered by installing the heat recovery part in a position close to the ceiling.

In the vehicle power supply system, the power supply part may include a coil part configured to wirelessly transmit power to the vehicle, and at least the coil part may be installed inside the storage part. The coil part may heat up when power is supplied wirelessly to the vehicle. Thus, in the vehicle power supply system, the heat generated by the coil part can be efficiently recovered by the heat recovery part by installing the coil part that heats up during power supply inside the storage part.

In the vehicle power supply system, the storage part may include an ingress-egress point through which the vehicle enters and exits, and may further include a door part for opening and closing the ingress-egress point. In this case, the vehicle power supply system enables entry and exit of the vehicle into and out of the storage part through the ingress-egress point by opening the door part, and is capable of preventing the heat inside the storage part from being released externally through the ingress-egress point by closing the door part.

The vehicle power supply system may further include a guide light installed inside the storage part and configured to guide the vehicle, and a lighting control part configured to control lighting of the guide light, wherein the lighting control part may be configured to turn the guide light on such that the guide light is on when the door part is open and there is no vehicle inside the storage part, and to turn the guide light off such that the guide light is off when the door part is closed. In this case, the vehicle power supply system is capable of reducing the energy required to keep the guide light on by turning the guide light on only when the vehicle needs to be guided with the guide light, and otherwise turning the guide light off.

The vehicle power supply system may further include a temperature measurement part configured to measure a temperature inside the storage part, and an open-and-close control part configured to control opening and closing operations of the door part, wherein the open-and-close control part may be configured to control the door part to be open when the temperature measured by the temperature measurement part is equal to or higher than a predetermined temperature threshold. In this case, the vehicle power supply system is capable of externally discharging hot air inside the storage part by opening the door part to open the ingress-egress point, and preventing the temperature inside the storage part from rising too high.

The vehicle power supply system may further include a battery information acquisition part configured to acquire battery state information including a state of an onboard battery from the vehicle inside the storage part, and an open-and-close control part configured to control opening and closing operations of the door part, wherein the open-and-close control part may be configured to control the door part to be open when the state of the onboard battery indicated by the battery state information acquired by the battery information acquisition part is a predetermined abnormal state. In this case, the vehicle power supply system enables the state of the vehicle inside the storage part to be easily observed from outside by opening the door part to open the ingress-egress point.

The vehicle power supply system may further include a temperature measurement part configured to measure a temperature inside the storage part, a ventilator configured to externally discharge air inside the storage part, and a ventilation control part configured to control operation of the ventilator, wherein the ventilation control part may be configured to operate the ventilator to externally discharge the air inside the storage part when the temperature measured by the temperature measurement part is equal to or higher than a predetermined temperature threshold. In this case, the vehicle power supply system is capable of externally discharging the hot air inside the storage part by operating the ventilator, and preventing the temperature inside the storage part from rising too high.

The vehicle power supply system may further include a waiting list generation part configured to generate, when the power supply unit is to supply power to a plurality of the vehicles in succession, a waiting list of the vehicles waiting to be supplied with power, and a heat supply control part configured to control a supply operation of the heat to the object to be supplied with heat by the heat supply unit, wherein the heat supply control part may be configured to maintain a supplying state of the heat to the object to be supplied with heat of the heat supply unit when there is a vehicle waiting to be supplied with power in the waiting list. In this case, when there is a vehicle waiting to be supplied with power, the vehicle power supply system is capable of continuing to supply heat to the object to be supplied with heat even while the vehicle in the storage part is being changed.

According to one aspect of the present disclosure, the heat generated during power supply to the vehicle can be efficiently recovered and used.

Embodiments of the present disclosure will be described below with reference to the drawings. It should be noted that like or corresponding elements are given like reference signs in the drawings and redundant explanation is omitted.

As illustrated in FIG. 1, a vehicle power supply system 1 is a system for supplying power to a vehicle V. The vehicle V of this embodiment is a self-driving vehicle that travels autonomously. The vehicle V is capable of travelling autonomously on the basis of instructions from the vehicle power supply system 1. The vehicle V is also capable of travelling autonomously to reach a position and receiving power on the basis of instructions from the vehicle power supply system 1. That is, the vehicle V is capable of receiving power unattended and automatically.

Figure 5:
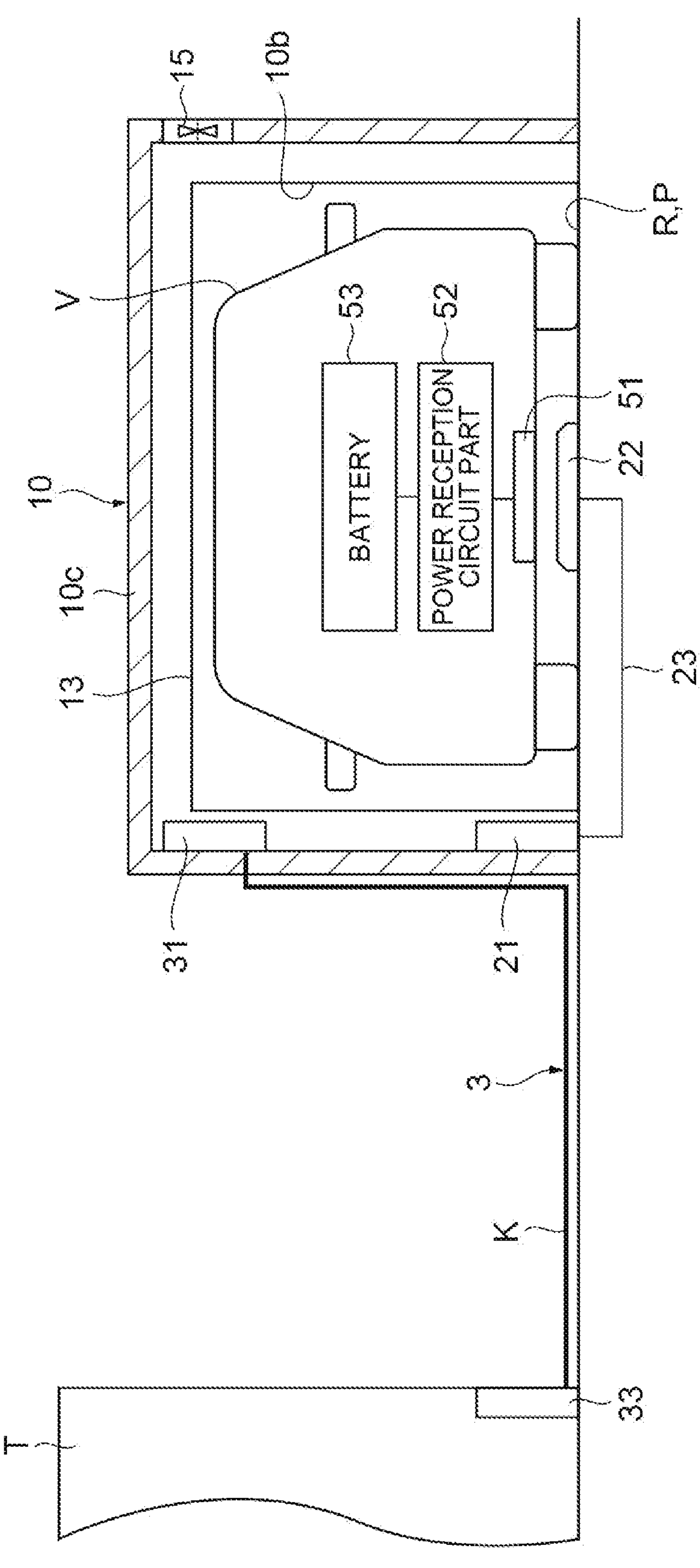
FIG. 5 is a schematic cross-sectional view illustrating a configuration for recovering heat inside the storage part.

In this embodiment, the vehicle V is, for example, an electric vehicle that travels by the electric power of a battery (onboard battery) 53 that is installed therein (see FIG. 5). The electric vehicle herein includes an automobile having only an electric motor as a power source, a plug-in hybrid automobile having an electric motor and an internal combustion engine as a power source, and the like. The vehicle V receives power from the vehicle power supply system 1 to charge the battery 53.

When the vehicle V is to charge the battery 53, the vehicle V waits in a power supply waiting area A1. The vehicle power supply system 1 guides the vehicle V waiting in the power supply waiting area A1 to a temporary stop area A2, and then into a storage part 10. The vehicle power supply system 1 supplies power to the vehicle V inside the storage part 10. After the power supply is completed, the vehicle power supply system 1 guides the vehicle V to a power supply-completed area A3.

In this embodiment, a plurality of the vehicles V is capable of parking at the power supply waiting area A1 and the power supply-completed area A3. The temporary stop area A2 is a standby area for the vehicle that is to enter the storage part 10 and allows one vehicle V to stop therein. The power supply waiting area A1, the temporary stop area A2, and the power supply-completed area A3 are set in advance on a road surface on which the vehicle V travels. The road surface is a surface on which the vehicle V can travel, and may, for example, be a floor inside a building or a road surface formed on the ground.

Although the power supply waiting area A1, the temporary stop area A2, and the power supply-completed area A3 are shown by broken lines in FIG. 1, the boundaries of all or a portion of these areas may be indicated by white lines or the like, but need not be indicated. Additionally, all or a portion of the power supply waiting area A1, the temporary stop area A2, and the power supply-completed area A3 may be painted with paint or the like.

As illustrated in FIGS. 1 and 2, the vehicle power supply system 1 includes a power supply unit 2, a heat pump (heat supply unit) 3, a power supply control device 4, a thermometer (temperature measurement part) S1, a vehicle sensor S2, a storage part guide light (guide light) L1, a temporary stop guide light L2, and a power supply-completed guide light L3.

The power supply unit 2 supplies power to the vehicle V. The power supply unit 2 includes the storage part 10 and a power supply part 20. The storage part 10 is provided in a power supply position for supplying power to the vehicle V and stores the vehicle V. The storage part 10 may be a building installed on the road surface, or a structure that simply covers the vehicle V. In this embodiment, the storage part 10 is large enough to store one vehicle V. The storage part 10 may be provided with a heat insulating material such as glass wool on inner walls and a lower surface of the ceiling. In this case, the storage part 10 is capable of increasing heat insulating properties between the inside and outside of the storage part 10.

As illustrated in FIGS. 3 and 4A to 4C, the storage part 10 includes an entrance (ingress-egress point) 10*a* for the vehicle V to enter the storage part 10, and an exit (ingress-egress point) 10*b* for the vehicle V to exit the storage part 10. In this embodiment, the entrance 10*a* and the exit 10*b* are formed in the storage part 10 in positions facing each other.

As shown in FIG. 2, the storage part 10 also includes an entrance door (door part) 11, an entrance door drive mechanism 12, an exit door (door part) 13, an exit door drive mechanism 14, and a ventilator 15.

The entrance door 11 opens and closes the entrance 10*a*. When the entrance door 11 is open, the entrance 10*a* is open. When the entrance door 11 is closed, the entrance 10*a* is closed. The entrance door drive mechanism 12 is a drive part for opening and closing the entrance door 11. The exit door 13 opens and closes the exit 10*b*. When the exit door 13 is open, the exit 10*b* is open. When the exit door 13 is closed, the exit 10*b* is closed. The exit door drive mechanism 14 is a drive part for opening and closing the exit door 13.

The configurations of the entrance door 11 and the exit door 13 are not limited. The entrance door 11 and the exit door 13 may, for example, be plate-like door members or shutters. The configurations of the entrance door drive mechanism 12 and the exit door drive mechanism 14 are not limited. The entrance door drive mechanism 12 and the exit door drive mechanism 14 may, for example, open and close the respective doors by the power of an electric motor, compressed air, or the like. The entrance door drive mechanism 12 and the exit door drive mechanism 14 are capable of independently opening and closing the entrance door 11 and the exit door 13, respectively, on the basis of instructions from the power supply control device 4.

As illustrated in FIG. 1, the storage part 10 is provided between the temporary stop area A2 and the power supply-completed area A3. In the storage part 10, the entrance 10*a* faces the temporary stop area A2 and the exit 10*b* faces the power supply-completed area A3. A floor surface R of the storage part 10 is smoothly connected with the road surface outside the storage part 10. The vehicle V is thus capable of moving easily from the temporary stop area A2 into the storage part 10 and from the storage part 10 to the power supply-completed area A3.

As shown in FIGS. 2 and 5, the ventilator 15 is capable of externally discharging air inside the storage part 10. The ventilator 15 is operated on the basis of instructions from the power supply control device 4.

Figure 3:
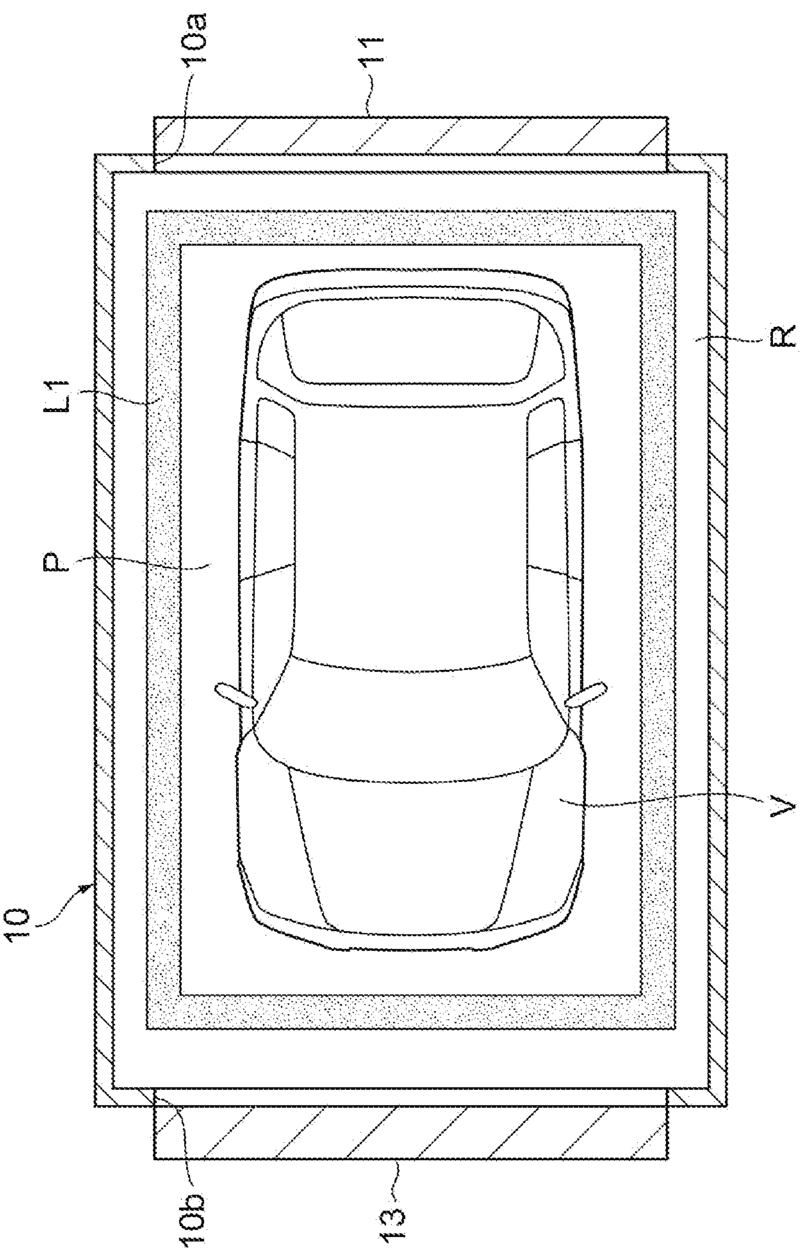
FIG. 3 is a top cross-sectional view illustrating an inner configuration of a storage part of FIG. 1.

The power supply part 20 shown in FIG. 2 supplies power to the vehicle V stored in the storage part 10. In this embodiment, the power supply part 20 wirelessly supplies power to the vehicle V. The power supply part 20 may supply power by electromagnetic induction. However, the method for supplying power is not limited thereto, and the power supply part 20 may wirelessly supply power by other methods such as magnetic resonance. As illustrated in FIG. 3, the floor surface R of the storage part 10 has a power supply area P that is set in advance. The power supply part 20 wirelessly supplies power to the vehicle V stopped in the power supply area P in a predetermined orientation (i.e., orientation in which the front of the vehicle V faces the exit door 13 and the back of the vehicle V faces the entrance door 11).

More specifically, the power supply part 20 includes a power transmission circuit part 21, a power transmission coil part (coil part) 22, and a cable 23. The power transmission circuit part 21, the power transmission coil part 22, and the cable 23 are provided in positions that do not interfere with the movement of the vehicle V entering and exiting the storage part 10.

As illustrated in FIG. 5, the power transmission circuit part 21 is, for example, installed in a low position inside the storage part 10 or on the floor surface R against an inner wall of the storage part 10 facing a side surface of the vehicle V. However, the position of the power transmission circuit part 21 is not limited thereto, and the power transmission circuit part 21 may be embedded in the floor surface R. The power transmission coil part 22 is, for example, installed on the floor surface R of the storage part 10. However, the position of the power transmission coil part 22 is not limited thereto, and the power transmission coil part 22 may be embedded in the floor surface R. The power transmission coil part 22 is provided in a position facing a power reception coil part 51 onboard the vehicle V when the vehicle V stops in the power supply area P set inside the storage part 10. The cable 23 is, for example, embedded in the floor surface R. However, the position of the cable 23 is not limited thereto, and the cable 23 may be laid on the floor surface R if the cable 23 is strong enough to be run over by tires of the vehicle V. Thus, the power supply part 20 has at least the power transmission coil part 22 stored inside the storage part 10.

The power transmission circuit part 21 converts power supplied from an external power source not shown into high frequency alternating current (AC) power, and supplies the converted high frequency AC power to the power transmission coil part 22 through the cable 23. The external power source may, for example, be a 50 Hz or 60 Hz commercial power source. For the external power source, solar power, wind power, or the like may be used, or power in which battery power is combined with solar power, wind power, or the like for stabilization may be used. The power transmission circuit part 21 may convert AC or direct current (DC) power from the external power source, as input, into DC power of a predetermined voltage using a power factor improving circuit, a rectifier, a DC-DC converter, and the like, and may further convert the same into high frequency AC power by an inverter. The frequency of the AC power that the power transmission circuit part 21 supplies to the power transmission coil part 22 may, for example, be 100 kHz.

The power transmission circuit part 21 is also capable of starting and stopping power supply to the vehicle V on the basis of instructions from the power supply control device 4. The power transmission circuit part 21 may, for example, determine to stop power supply to the vehicle V on the basis of a predetermined condition such as the state of the power transmission coil part 22, and stop the power supply.

The power transmission coil part 22 wirelessly transmits power to the vehicle V. The power transmission coil part 22 converts the high frequency AC power supplied through the cable 23 into a magnetic field. The magnetic field generated by the power transmission coil part 22 causes a coil of the power reception coil part 51 onboard the vehicle V to generate electromotive force by electromagnetic induction, so that power is wirelessly transmitted. The power transmission coil part 22 is configured, for example, by combining a circular coil with a capacitor and an inductor for increasing wireless power transmission efficiency. However, the power transmission coil part 22 may have other inner configurations so long as power can be transmitted wirelessly.

As shown in FIG. 2, the heat pump 3 is the heat supply unit that recovers heat and supplies the recovered heat to an object to be supplied with heat. The heat pump 3 recovers the heat generated during power supply to the vehicle V by the power supply unit 2. In this embodiment, the heat pump 3, for example, supplies the heat to a building T as the object to be supplied with heat as illustrated in FIG. 5. The building T is installed outside the storage part 10. However, the object to be supplied with heat is not limited thereto, and the heat pump 3 may supply the heat to an object to be supplied with heat other than the building T. The heat supplied to the building T is, for example, used for heating in the building T.

In this embodiment, the difference between a temperature of the storage part 10 that recovers the heat and a temperature of the building T to which the heat is supplied is irrelevant to the heat pump 3. It is only required that the heat pump 3 is capable of recovering the heat of the storage part 10 and supply the same to the building T. For example, when the temperature inside the storage part 10 is higher than that of the building T, the temperature of a condenser (heat release part) 33 described further below may be even higher than that inside the storage part 10. However, since the temperature of the condenser 33 is higher than that of the building T, heat is radiated from the condenser 33 to the building T, so that the heat is transferred from the storage part 10 to the building T.

Figure 6:
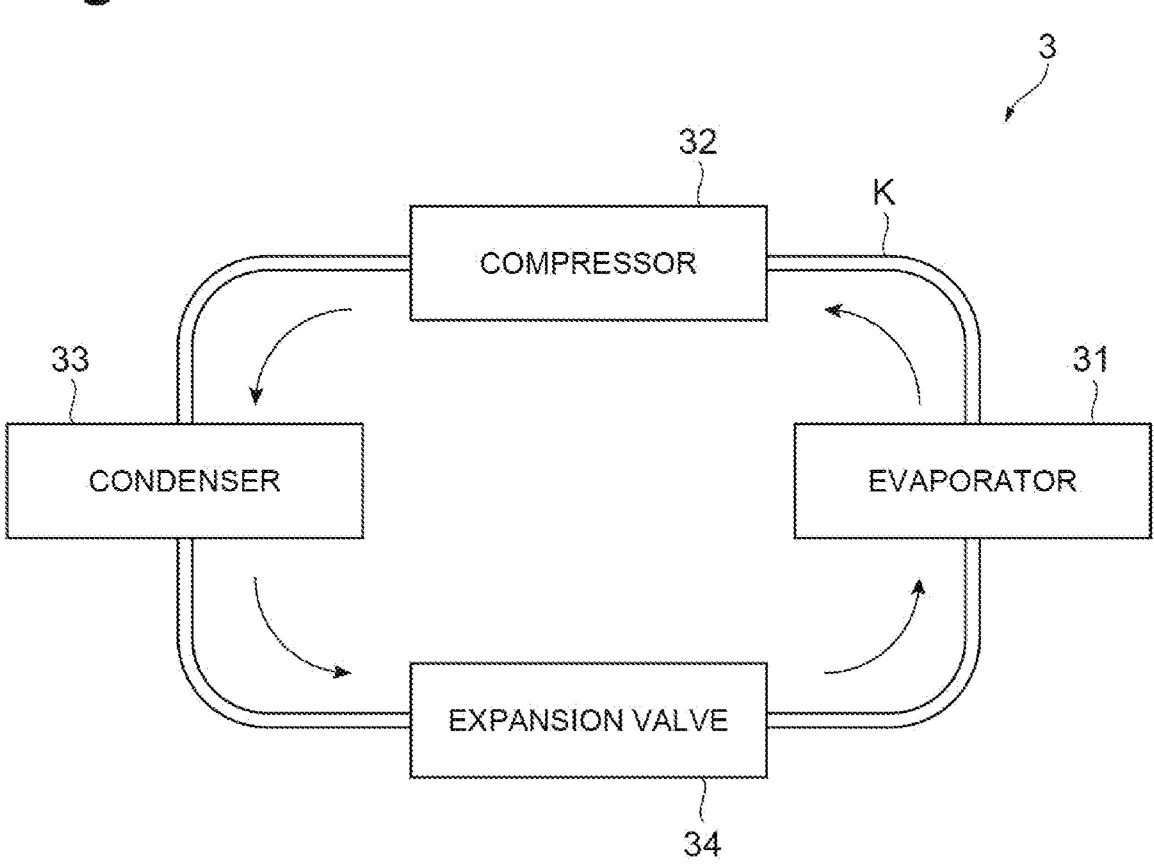
FIG. 6 is a schematic diagram illustrating a heat pump.

As illustrated in FIG. 6, the heat pump 3 includes an evaporator (heat recovery part) 31, a compressor (heat transfer mechanism) 32, the condenser 33, an expansion valve (heat transfer mechanism) 34, and a pipe (heat transfer mechanism) K. The heat pump 3 also includes a refrigerant (heat transfer medium) not shown that circulates inside the pipe K. The pipe K connects the evaporator 31 to the compressor 32, the compressor 32 to the condenser 33, the condenser 33 to the expansion valve 34, and the expansion valve 34 to the evaporator 31. The refrigerant is thus capable of circulating, in sequence, from the evaporator 31 to the compressor 32, to the condenser 33, to the expansion valve 34, and to the evaporator 31.

The heat pump 3 repeats a heat cycle that includes an evaporation step, a compression step, a condensation step, and an expansion step of the refrigerant to absorb the heat inside the storage part 10 and radiate the heat to the building T to transfer the heat from inside the storage part 10 to the building T. That is, the heat pump 3 cools the inside of the storage part 10 and heats the building T. As illustrated in FIG. 5, the evaporator 31 is installed inside the storage part 10. In this embodiment, the evaporator 31 is installed in a position close to a ceiling 10*c* of the storage part 10 (a position closer to the ceiling 10*c* of the storage part 10 than to the floor surface R of the storage part 10). The evaporator 31 is, for example, attached to the inner wall of the storage part 10. The evaporator 31 recovers the heat inside the storage part 10. Here, the evaporator 31 performs the evaporation step of evaporating (vaporizing) the refrigerant by the heat inside the storage part 10.

The compressor 32 performs the compression step of compressing the refrigerant evaporated by the evaporator 31 and raising the temperature thereof. The location to install the compressor 32 is not limited. Since the location to install the compressor 32 is not limited, the compressor 32 is not shown in FIG. 5. The refrigerant of which the temperature has been raised by compression is sent to the condenser 33 by the pipe K.

The condenser 33 is installed inside the building T outside the storage part 10. The condenser 33 releases the heat recovered by the evaporator 31 to the building T. More specifically, the condenser 33 performs the condensation step of releasing the heat from the refrigerant of which the temperature has been raised by the compressor 32 to the building T and condenses the refrigerant. In the condensation step, the refrigerant returns to liquid from gas.

The expansion valve 34 performs the expansion step of cooling the refrigerant condensed by the condenser 33. The location to install the expansion valve 34 is not limited. Since the location to install the expansion valve 34 is not limited, the expansion valve 34 is not shown in FIG. 5. The refrigerant cooled in the expansion step is sent to the evaporator 31, and the evaporation step described for the evaporator 31 above is performed again. Thus, the compressor 32, the expansion valve 34, and the pipe K function as the heat transfer mechanism for transferring the heat recovered by the evaporator 31 to the condenser 33.

As shown in FIG. 2, the thermometer S1 measures the temperature inside the storage part 10. The type of the thermometer S1 is not limited. The detection result from the thermometer S1 is transmitted to the power supply control device 4.

The vehicle sensor S2 detects whether there is a vehicle V inside the storage part 10. For example, the vehicle sensor S2 may be a sensor embedded in the floor surface R of the storage part 10 capable of detecting metal in a predetermined range on the floor surface R (for example, up to tens of centimeters above the floor surface R). When metal is detected by this vehicle sensor S2, it can be determined that there is a vehicle V inside the storage part 10. The type of the vehicle sensor S2 is not limited. The detection result from the vehicle sensor S2 is transmitted to the power supply control device 4.

The storage part guide light L1 serves as a guide for guiding the vehicle V to the power supply area P set inside the storage part 10. In this embodiment, the storage part guide light L1 is provided on the floor surface R of the storage part 10. In this embodiment, for example, as illustrated in FIG. 3, the storage part guide light L1 is installed in a rectangular frame shape on the floor surface R so as to surround the power supply area P set on the floor surface R. The storage part guide light L1 may, for example, be a white light emitting diode that emits light planarly. In this case, the storage part guide light L1 forms a white line surrounding the power supply area P by emitting light. In the case in which the storage part guide light L1 is a light emitting diode, the storage part guide light L1 is driven by a power source and an electronic control element such as a power MOSFET.

The vehicle V is capable of travelling autonomously on the basis of an image captured by a camera 71 that images the surroundings of the vehicle V. The vehicle V is capable of recognizing the storage part guide light L1 that is emitting light from the image captured by the camera 71, and travelling autonomously to the power supply area P on the basis of the recognized storage part guide light L1. The storage part guide light L1 emits light when guiding the vehicle V, so that the need for installing lighting facilities inside the storage part 10 is eliminated. The vehicle V is capable of recognizing the storage part guide light L1 that is emitting light from the image captured by the camera 71 without any lighting facilities inside the storage part 10. The storage part guide light L1 is switched on and off based on instructions from the power supply control device 4.

As illustrated in FIG. 1, the temporary stop guide light L2 serves as a guide for guiding the vehicle V from the power supply waiting area A1 to the temporary stop area A2. In this embodiment, the temporary stop guide light L2 is provided on the road surface of the temporary stop area A2. In this embodiment, the temporary stop guide light L2 is provided in a rectangular frame shape indicating the temporary stop area A2. The temporary stop guide light L2 has a configuration similar to that of the storage part guide light L1. In a manner similar to that of the storage part guide light L1, the vehicle V is capable of recognizing the temporary stop guide light L2 that is emitting light from the image captured by the camera 71, and travelling autonomously from the power supply waiting area A1 to the temporary stop area A2. The temporary stop guide light L2 is switched on and off on the basis of instructions from the power supply control device 4.

The positional relationship between the power supply waiting area A1 and the temporary stop area A2 is such that the temporary stop guide light L2 of the temporary stop area A2 is in the imaging field of view of the camera 71 of the vehicle V stopped in the power supply waiting area A1. The vehicle V stopped in the power supply waiting area A1 is thus capable of recognizing the emission of light of the temporary stop guide light L2 of the temporary stop area A2 and travelling to the temporary stop area A2.

Additionally, the positional relationship between the temporary stop area A2 and the storage part 10 (power supply area P) is such that the storage part guide light L1 inside the storage part 10 is in the imaging field of view of the camera 71 of the vehicle V stopped in the temporary stop area A2 when the entrance 10*a* of the storage part 10 is open. The vehicle V stopped in the temporary stop area A2 is thus capable of recognizing the emission of light of the storage part guide light L1 and travelling to the power supply area P.

As illustrated in FIG. 1, the power supply-completed guide light L3 serves as a guide for guiding the vehicle V from the power supply area P to the power supply-completed area A3. In this embodiment, the power supply-completed guide light L3 is provided on the road surface of the power supply-completed area A3. In this embodiment, the power supply-completed guide light L3 is provided in a rectangular frame shape indicating a stop area of the vehicle V in the power supply-completed area A3. In this embodiment, three of the stop areas are provided in the power supply-completed area A3. In other words, there are three of the power supply-completed guide lights L3 in the power supply-completed area A3.

Each of the three power supply-completed guide lights L3 indicates a stop area of the vehicle V by a rectangular frame. The power supply-completed guide lights L3 have a configuration similar to that of the storage part guide light L1. In a manner similar to that of the storage part guide light L1, the vehicle V is capable of recognizing the power supply-completed guide light L3 that is emitting light from the image captured by the camera 71, and travelling autonomously from the storage part 10 (power supply area P) to the stop area provided in the power supply-completed area A3. The power supply-completed guide lights L3 are switched on and off on the basis of instructions from the power supply control device 4. Additionally, one of the three power supply-completed guide lights L3 emits light on the basis of instructions from the power supply control device 4. The vehicle V travels toward the stop area indicated by the power supply-completed guide light L3 that is emitting light.

The positional relationship between the storage part 10 (power supply area P) and the power supply-completed area A3 is such that the power supply-completed guide lights L3 in the power supply-completed area A3 are in the imaging field of view of the camera 71 of the vehicle V stopped inside the storage part 10 when the exit 10*b* of the storage part 10 is open. The vehicle V stopped inside the storage part 10 is thus capable of recognizing the emissions of light of the power supply-completed guide lights L3 and travelling to the stop area indicated by the power supply-completed guide light L3 that is emitting light.

The storage part guide light L1, the temporary stop guide light L2, and the power supply-completed guide light L3 are not limited to being provided in a rectangular frame shape so long as they are capable of guiding the vehicle V to and causing the vehicle V to stop at the respective predetermined positions.

As shown in FIG. 2, the power supply control device 4 performs various controls such as supplying power to the vehicle V in the vehicle power supply system 1. The power supply control device 4 may, for example, be provided inside the storage part 10 or outside the storage part 10. The power supply control device 4 is configured as a computer that includes a communication part 40, a power supply electronic control unit (ECU) 41, an input output device not shown, and the like.

The communication part 40 is a communication device that communicates with parts of the vehicle power supply system 1 and the vehicle V. The communication part 40 includes a wireless communication device, and wirelessly communicates with the vehicle V. The communication part 40 may communicate wired or wirelessly with parts of the vehicle power supply system 1.

In a case in which, for example, the wall surface of the storage part 10 includes metal, it may be difficult for communication radio waves to pass therethrough. In this case, a wireless communication antenna of the communication part 40 may be provided both on the inside and the outside of the storage part 10, and a wireless communication device may be provided both on the inside and the outside of the storage part 10 to enable wireless communication with the communication part 40 regardless of whether the vehicle V is positioned inside or outside the storage part 10.

The power supply ECU 41 is a processing part that performs various controls such as power supply to the vehicle V. The power supply ECU 41 is composed of an electronic control unit that includes a microprocessor, a memory, a storage device that stores a program that defines an operation, and the like. In the power supply ECU 41, for example, the program stored in the storage device is loaded to the memory, and the program loaded to the memory is executed by the microprocessor to achieve various functions.

When a power supply request signal from the vehicle V is received by the communication part 40, the power supply ECU 41 guides the vehicle V to the power supply area P inside the storage part 10, and performs a power supply process to the vehicle V. When the power supply is completed, the power supply ECU 41 guides the vehicle V from inside the storage part 10 to the power supply-completed area A3. To perform these processes, the power supply ECU 41 functionally includes a waiting list generation part 42, a guide control part (lighting control part) 43, an open-and-close control part 44, a power supply control part 45, a heat supply control part 46, a battery information acquisition part 47, and a ventilation control part 48.

When the power supply request signal from the vehicle V is received, the waiting list generation part 42 generates a waiting list of vehicles V waiting to be supplied with power. This waiting list is a list of the vehicles V waiting to be supplied with power when the power supply unit 2 is to supply power to a plurality of the vehicles V in succession. To receive power, the vehicle V moves to the power supply waiting area A1 and waits there. The vehicle V that enters the power supply waiting area A1 transmits a vehicle ID thereof to the power supply control device 4 together with the power supply request signal. For example, when the power supply request signal is received, the waiting list generation part 42 adds the vehicle ID received together with the power supply request signal to the waiting list. When there is a plurality of the vehicles V in the power supply waiting area A1, a plurality of the vehicle IDs is stored in the waiting list. The waiting list is stored, for example, in the memory of the power supply ECU 41.

When the power supply unit 2 is capable of supplying power to the vehicle V, the waiting list generation part 42 selects one of the vehicle IDs stored in the waiting list, and deletes the selected vehicle ID from the waiting list. The vehicle V of which the vehicle ID is removed from the waiting list is to be the vehicle V to be supplied with power.

When there is no vehicle V inside the storage part 10, the vehicle V is allowed to enter the power supply area P inside the storage part 10 and can be supplied with power. The waiting list generation part 42 is thus capable of using a state in which the vehicle sensor S2 detects that there is no vehicle V inside the storage part 10 as a state in which the power supply unit 2 is capable of supplying power.

However, when the vehicle sensor S2 detects that there is a vehicle V inside the storage part 10, the power supply area P inside the storage part 10 is occupied, that is, a vehicle V is receiving power in the power supply area P. Thus, when a vehicle V is detected by the vehicle sensor S2, the waiting list generation part 42 waits until the vehicle sensor S2 detects that there is no vehicle V.

Additionally, when a plurality of the vehicle IDs is stored in the waiting list, the waiting list generation part 42 selects and deletes one of the vehicle IDs. For example, the waiting list generation part 42 may select the vehicle V of the least recently stored vehicle ID in the waiting list, and delete this vehicle ID. Alternatively, for example, the waiting list generation part 42 may randomly select one of the plurality of the vehicle IDs, and delete this vehicle ID. The method by which the waiting list generation part 42 selects the vehicle ID is not limited.

The guide control part 43 guides the vehicle V to the temporary stop area A2, the power supply area P, and the power supply-completed area A3 by controlling lighting of the storage part guide light L1, the temporary stop guide light L2, and the power supply-completed guide light L3 and providing the vehicle V with instructions for entry therein. The guide control part 43 is capable of instructing the vehicle V to enter each area by transmitting an entry instruction signal or an exit instruction signal to the vehicle V via the communication part 40.

The guiding of the vehicle V from the power supply waiting area A1 to the temporary stop area A2 will first be described. When the vehicle V to be supplied with power is selected by the waiting list generation part 42 (when the vehicle ID is deleted), the guide control part 43 turns the temporary stop guide light L2 on. The vehicle V to be supplied with power that is stopped in the power supply waiting area A1 is thus capable of imaging the temporary stop guide light L2 that is emitting light with the camera 71 onboard the vehicle V and recognizing the temporary stop guide light L2. After turning the temporary stop guide light L2 on, the guide control part 43 transmits the entry instruction signal to enter the temporary stop area A2 to the vehicle V to be supplied with power.

When the vehicle V to be supplied with power that is stopped in the power supply waiting area A1 receives the entry instruction signal, the vehicle V autonomously travels to the temporary stop area A2 indicated by the temporary stop guide light L2 that is emitting light. The vehicle V that arrives at the temporary stop area A2 stops at the temporary stop area A2, and transmits an arrival signal indicating that the vehicle V has arrived at the temporary stop area A2 to the power supply control device 4.

The guiding of the vehicle V from the temporary stop area A2 to the power supply area P inside the storage part 10 will be described next. When the communication part 40 receives the arrival signal indicating that the vehicle V has arrived at the temporary stop area A2, the guide control part 43 turns the storage part guide light L1 on. The open-and-close control part 44 then controls the entrance door 11 to be open. In other words, the guide control part 43 controls the lighting of the storage part guide light L1 so that the storage part guide light L1 is on when the entrance 10*a* is open and there is no vehicle V inside the storage part 10.

The vehicle V to be supplied with power that is stopped in the temporary stop area A2 is thus capable of imaging the storage part guide light L1 that is emitting light with the camera 71 onboard the vehicle V through the entrance 10*a* of the storage part 10 and recognizing the storage part guide light L1. After turning the storage part guide light L1 on, the guide control part 43 transmits the entry instruction signal to enter the power supply area P to the vehicle V to be supplied with power. After transmitting the entry instruction signal to enter the power supply area P, the guide control part 43 turns the temporary stop guide light L2 off.

When the vehicle V to be supplied with power that is stopped in the temporary stop area A2 receives the entry instruction signal, the vehicle V autonomously travels to the power supply area P indicated by the storage part guide light L1 that is emitting light. The vehicle V that arrives at the power supply area P stops at the power supply area P, and transmits the arrival signal indicating that the vehicle V has arrived at the power supply area P to the power supply control device 4. When the communication part 40 receives the arrival signal indicating that the vehicle V has arrived at the power supply area P, the guide control part 43 turns the storage part guide light L1 off. The vehicle V then receives power at the power supply area P.

The guiding of the vehicle V from the power supply area P to the power supply-completed area A3 will be described next. When power supply to the vehicle V is completed, the guide control part 43 turns the power supply-completed guide light L3 on. Here, when a power supply-completed condition is met, the guide control part 43 is capable of determining that the power supply is completed. The guide control part 43 is capable of determining that the power supply is completed, for example, when the communication part 40 receives a charge completion signal indicating that charging of the battery 53 is completed from the vehicle V. The guide control part 43 may also determine that the power supply-completed condition is met when a predetermined amount of time has passed from the start of the power supply to the vehicle V. The power supply to the vehicle V may be stopped by the power transmission circuit part 21 determining to stop the power supply. In this case, the guide control part 43 may determine that the power supply-completed condition is met when the power transmission circuit part 21 stops the power supply.

Additionally, the guide control part 43 turns on one of the power supply-completed guide lights L3 selected therefrom. Here, the guide control part 43 selects and turns on the power supply-completed guide light L3 at which no other vehicle V is stopped. The exit door 13 is then opened by the open-and-close control part 44. The vehicle V that is stopped in the power supply area P is thus capable of imaging the power supply-completed guide light L3 that is emitting light with the camera 71 onboard the vehicle V through the exit 10*b* of the storage part 10 and recognizing the power supply-completed guide light L3. After turning the power supply-completed guide light L3 on, the guide control part 43 transmits the exit instruction signal instructing the vehicle V to exit the power supply area P to the vehicle V for which power supply is completed.

When the vehicle V for which power supply is completed that is stopped in the power supply area P receives the exit instruction signal, the vehicle V autonomously travels to the stop area indicated by the power supply-completed guide light L3 that is emitting light in the power supply-completed area A3. The vehicle V that arrives at the power supply-completed area A3 stops there, and transmits the arrival signal indicating that the vehicle V has arrived at the power supply-completed area A3 to the guide control part 43.

Thus, the guide control part 43 is capable of guiding the vehicle V to each area by turning on the storage part guide light L1, the temporary stop guide light L2, and the power supply-completed guide light L3, and by providing instructions to the vehicle V.

The open-and-close control part 44 controls opening and closing operations of the entrance door 11 and the exit door 13. Here, the open-and-close control part 44 controls the opening and closing operations of the entrance door 11 by providing instructions to the entrance door drive mechanism 12. The open-and-close control part 44 also controls the opening and closing operations of the exit door 13 by providing instructions to the exit door drive mechanism 14.

When there is a vehicle V inside the storage part 10, the open-and-close control part 44 controls the entrance door 11 and the exit door 13 to be closed. That is, the entrance door 11 and the exit door 13 are closed during power supply to the vehicle V. When the vehicle V is to enter the storage part 10, the open-and-close control part 44 controls the entrance door 11 to be open. For example, when the communication part 40 receives the arrival signal indicating that the vehicle V has arrived at the temporary stop area A2, the open-and-close control part 44 controls the entrance door 11 to be open. When power supply to the vehicle V is completed and the vehicle V is to exit the storage part 10, the open-and-close control part 44 controls the exit door 13 to be open. For example, when the power supply-completed condition is met and the power supply is completed, the open-and-close control part 44 controls the exit door 13 to be open.

Even when there is a vehicle V inside the storage part 10, the open-and-close control part 44 is capable of controlling at least one of the entrance door 11 or the exit door 13 to be open on the basis of battery state information acquired by the battery information acquisition part 47. Here, when a state of the battery 53 of the vehicle V indicated by the battery state information is a predetermined abnormal state, the open-and-close control part 44 controls at least one of the entrance door 11 or the exit door 13 to be open to open at least one of the entrance 10*a* or the exit 10*b*.

The predetermined abnormal state may be predetermined on the basis of a temperature of the battery 53, or may be predetermined on the basis of an amount of charge in the battery 53 relative to the charge time. Various states can be set in advance as the abnormal state. When it is determined that the battery 53 is in the abnormal state, the power supply control part 45 stops power supply to the vehicle V by the power supply part 20.

Additionally, even when there is a vehicle V inside the storage part 10, the open-and-close control part 44 is capable of controlling at least one of the entrance door 11 or the exit door 13 to be open on the basis of the temperature inside the storage part 10 measured by the thermometer S1. For example, when the temperature measured by the thermometer S1 is equal to or higher than a predetermined temperature threshold, the open-and-close control part 44 controls at least one of the entrance door 11 or the exit door 13 to be open to open at least one of the entrance 10*a* or the exit 10*b*. The predetermined temperature threshold here may be the upper limit of the rated temperature of a device, a charging unit 5, or the like onboard the vehicle V.

The power supply control part 45 controls power supply to the vehicle V by the power supply part 20. The power supply control part 45 controls the power supply by instructing the power transmission circuit part 21 of the power supply part 20 to start and stop power supply. Here, when the communication part 40 receives the arrival signal indicating that the vehicle V has arrived at the power supply area P from the vehicle V, the power supply control part 45 instructs the power supply part 20 to start power supply. When the power supply-completed condition described above is met, the power supply control part 45 determines that power supply should be completed, and instructs the power supply part 20 to stop the power supply.

The power supply control part 45 is capable of instructing the power supply part 20 to stop power supply on the basis of the battery state information acquired by the battery information acquisition part 47. Here, when the state of the battery 53 of the vehicle V indicated by the battery state information is the predetermined abnormal state, the power supply control part 45 is capable of instructing the power supply to be stopped.

The power supply control part 45 is also capable of instructing the power supply part 20 to stop power supply on the basis of the temperature inside the storage part 10 measured by the thermometer S1. For example, the power supply control part 45 is capable of instructing the power supply to be stopped when the temperature measured by the thermometer S1 is equal to or higher than the predetermined temperature threshold.

The heat supply control part 46 controls a supply operation of heat to the building T by the heat pump 3. When power is supplied to the vehicle V inside the storage part 10, the heat supply control part 46 operates the heat pump 3 to supply heat to the building T. Additionally, the power supply unit 2 may supply power to a plurality of vehicles V in succession, that is, when the vehicle ID of a vehicle V waiting to be supplied with power is in the waiting list generated by the waiting list generation part 42. In this case, even when power supply is stopped to change the vehicle V to be supplied with power inside the storage part 10, the heat supply control part 46 maintains a supplying state of heat to the building T (i.e., continues operation) of the heat pump 3.

The battery information acquisition part 47 acquires the battery state information including the state of the battery 53 from the vehicle V inside the storage part 10 via the communication part 40. The acquired battery state information is used to guide the vehicle V by the guide control part 43 and to open and close the entrance door 11 and the exit door 13 by the open-and-close control part 44 as described above.

The ventilation control part 48 controls operation of the ventilator 15. When the temperature inside the storage part 10 measured by the thermometer S1 is equal to or higher than the predetermined temperature threshold, the ventilation control part 48 operates the ventilator 15 to externally discharge the air inside the storage part 10.

Figure 7:
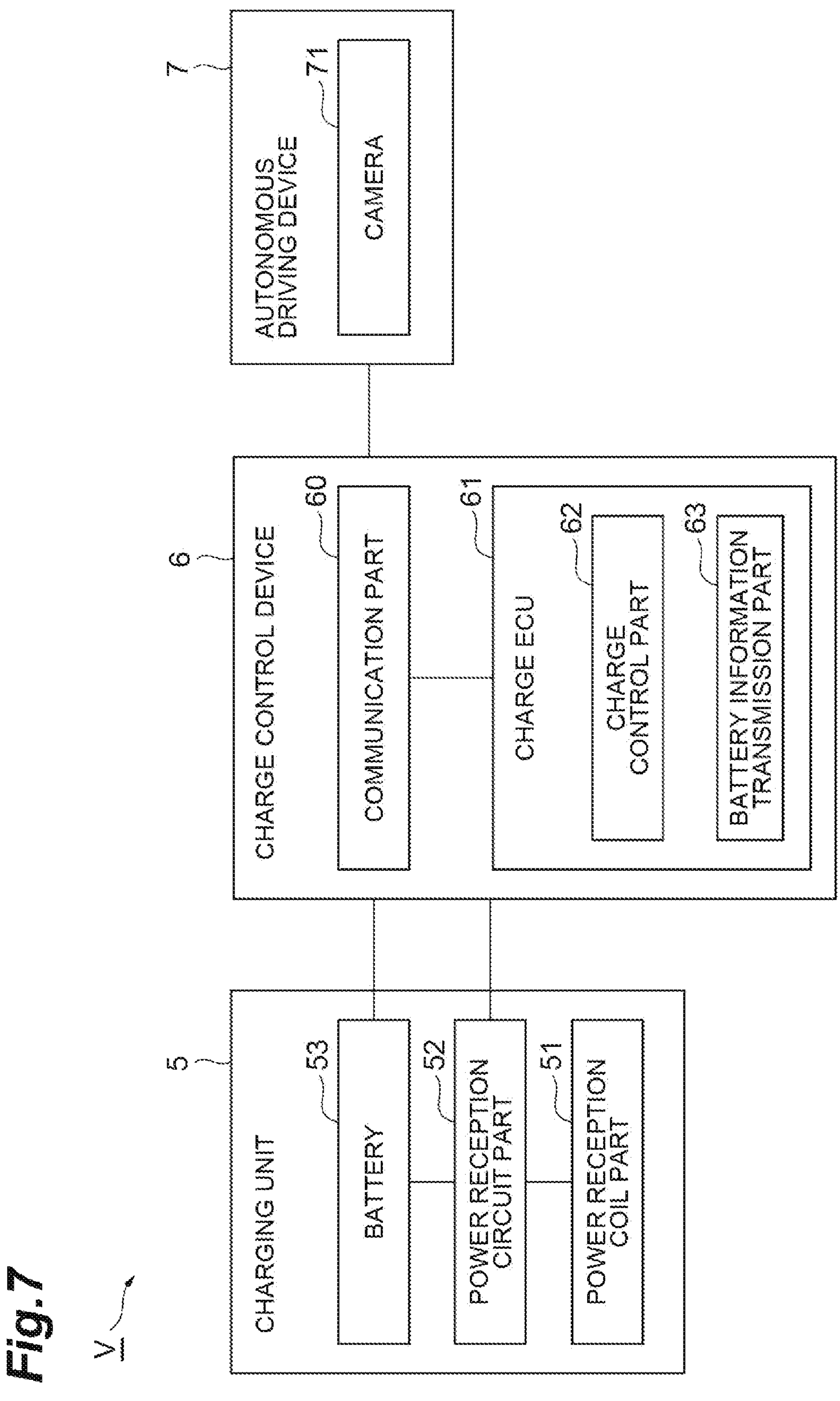
FIG. 7 is a block diagram illustrating a configuration of the vehicle.

The configuration of the vehicle V will be described next. As shown in FIG. 7, the vehicle V includes the charging unit 5, a charge control device 6, and an autonomous driving device 7. When the vehicle V is stopped in the power supply area P, the charging unit 5 wirelessly receives power transmitted from the power transmission coil part 22 of the power supply part 20 in the vehicle power supply system 1. The charging unit 5 includes the power reception coil part 51, a power reception circuit part 52, and the battery 53.

As illustrated in FIG. 5, the power reception coil part 51 is provided on a lower surface of the vehicle V. More specifically, the power reception coil part 51 is provided in a position vertically facing the power transmission coil part 22 when the vehicle V stops in the power supply area P. The power reception coil part 51 wirelessly receives power from the power transmission coil part 22 of the power supply part 20. The power reception coil part 51 is configured, for example, by combining a circular coil with a capacitor and an inductor for increasing wireless power reception efficiency. However, the power reception coil part 51 may have other inner configurations so long as power can be received wirelessly.

The power transmission coil part 22 of the power supply part 20 generates a magnetic field while facing the power reception coil part 51 of the vehicle V. The magnetic field generated by the power transmission coil part 22 interlinks with the coil of the power reception coil part 51 to generate electromotive force in the coil of the power reception coil part 51. The power reception coil part 51 is thus capable of wirelessly receiving power from the power transmission coil part 22. The power generated by the power reception coil part 51 is input to the power reception circuit part 52.

The power reception circuit part 52 includes a rectifier circuit that converts AC power received by the power reception coil part 51 into DC power, and a DC-DC converter that converts the voltage of DC power into a voltage suitable for charging the battery 53. The output from the power reception circuit part 52 is input to the battery 53 to charge the battery 53. The charging unit 5 thus wirelessly receives power from the power supply part 20 and charges the battery 53. The battery 53 is used as a power source for an electric motor onboard the vehicle V, and the like.

The position in which to install the power reception circuit part 52 and the battery 53 inside the vehicle V is not limited. For example, the power reception circuit part 52 and the battery 53 may be installed in a low position close to a floor surface of the vehicle V to lower the center of gravity of the vehicle V to stabilize the travel of the vehicle V.

As shown in FIG. 7, the charge control device 6 controls the charging of the battery 53 of the vehicle V. The charge control device 6 is configured as a computer that includes a communication part 60, a charge ECU 61, an input output device not shown, and the like.

The communication part 60 is a communication device that communicates with parts of the vehicle V and the power supply control device 4 of the vehicle power supply system 1. The communication part 60 includes a wireless communication device, and wirelessly communicates with the communication part 40 of the power supply control device 4. The communication part 60 may communicate wired or wirelessly with the charging unit 5 and the autonomous driving device 7 of the vehicle V.

The charge ECU 61 is a processing part that performs various controls such as the charging of the battery 53. The charge ECU 61 is composed of an electronic control unit that includes a microprocessor, a memory, a storage device that stores a program that defines an operation, and the like. In the charge ECU 61, for example, the program stored in the storage device is loaded to the memory, and the program loaded to the memory is executed by the microprocessor to achieve various functions.

The charge ECU 61 functionally includes a charge control part 62 and a battery information transmission part 63. When the vehicle V arrives at the power supply waiting area A1 to charge the battery 53, the charge control part 62 transmits the power supply request signal to the power supply control device 4 via the communication part 60. When transmitting the power supply request signal, the charge control part 62 transmits the vehicle ID for identifying the vehicle V in which it is installed together with the power supply request signal. The charge control device 6 is provided with the vehicle ID in advance to distinguish it from other charge control devices 6 (vehicles V). Each vehicle V has a different vehicle ID. For example, a mobile phone number, an IP address for internet communication, or other equivalent identification information may be used as the vehicle ID. Using the vehicle ID enables the power supply control device 4 to identify the vehicle V with which to communicate from among a plurality of the vehicles V and wirelessly communicate therewith.

When the vehicle V arrives at the temporary stop area A2 and when the vehicle V arrives at the power supply area P by being guided by the power supply control device 4, the charge control part 62 transmits the arrival signal indicating that the vehicle V has arrived at the respective area to the power supply control device 4 via the communication part 60. The charge control part 62 is capable of also transmitting the vehicle ID when transmitting the arrival signal. The power supply control device 4 is thus capable of identifying the vehicle V that transmitted the arrival signal.

Additionally, when the charging of the battery 53 is completed such as when the battery 53 is in a fully charged state, the charge control part 62 transmits the charge completion signal indicating that the charging of the battery 53 is completed to the power supply control device 4 via the communication part 60. The charge control part 62 is capable of determining whether the charging has been completed, for example, by monitoring the state of the battery 53.

The battery information transmission part 63 generates the battery state information including the state of the battery 53, and transmits the generated battery state information to the power supply control device 4 via the communication part 60. The battery state information includes, for example, information for determining whether there are any abnormalities in the battery 53, that is, whether the battery 53 is in the abnormal state or not. The battery information transmission part 63 is capable of generating the battery state information, for example, by monitoring the state of the battery 53.

The autonomous driving device 7 is a device for causing the vehicle V to travel autonomously. For example, the autonomous driving device 7 may recognize external conditions of the vehicle V on the basis of a detection result from a detection sensor (camera, LiDAR, etc.) that detects the external conditions, and cause the vehicle V to travel autonomously by controlling the steering mechanism, drive motor, and the like of the vehicle V. Various known devices may be used as the autonomous driving device 7.

In this embodiment, the autonomous driving device 7 includes the camera 71 that images an area ahead of the vehicle V. The autonomous driving device 7 is capable of recognizing the conditions ahead on the basis of the image captured by the camera 71, and causing the vehicle V to drive autonomously on the basis of the result of recognition. The field of view of the camera 71 extends horizontally, and may cover the area in which the vehicle V is capable of changing the direction of travel through steering. As described above, the autonomous driving device 7 recognizes the storage part guide light L1, etc., that are emitting light on the basis of the images captured by the camera 71, and causes the vehicle V to travel autonomously on the basis of the positions of the recognized storage part guide light L1, etc. Here, the autonomous driving device 7 causes the vehicle V to travel autonomously to the temporary stop area A2, the power supply area P, and the power supply-completed area A3 on the basis of the entry instruction signal or the exit instruction signal transmitted from the power supply control device 4.

Each of the vehicles V that receives power in the vehicle power supply system 1 has the charging unit 5, the charge control device 6, and the autonomous driving device 7 which have been described using FIG. 7.

Figure 4A:
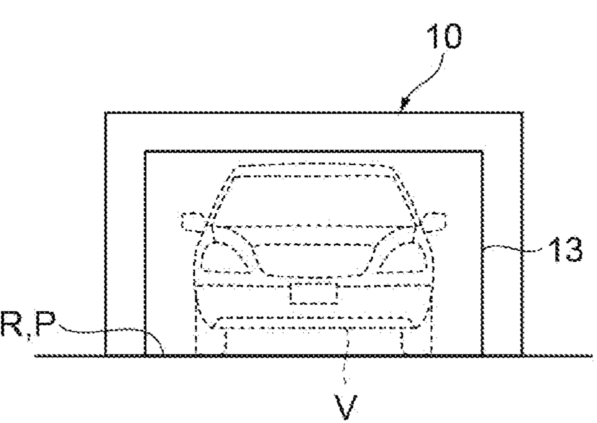
FIG. 4A is a diagram of the storage part seen from an exit door side.
Figure 4B:
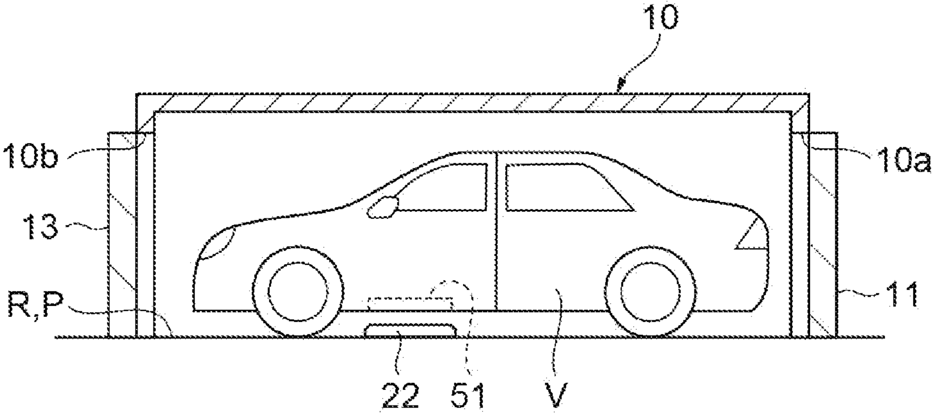
FIG. 4B is a side cross-sectional view illustrating the inner configuration of the storage part.
Figure 4C:
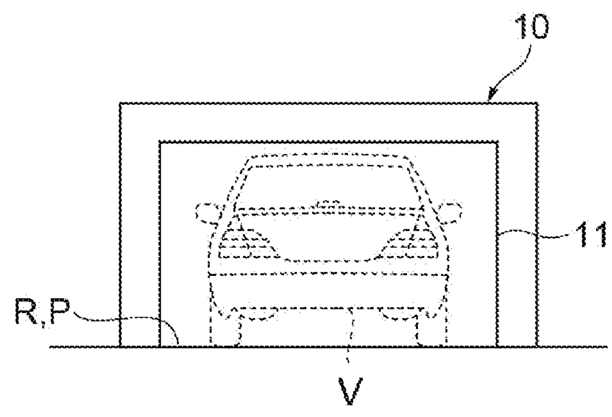
FIG. 4C is a diagram of the storage part seen from an entrance door side.

The heat generated during power supply to the vehicle V inside the storage part 10 and recovery of the heat by the heat pump 3 will be described next. As illustrated in FIG. 4B, the entrance door 11 and the exit door 13 are closed during power supply to the vehicle V. The warmed air (heat) inside the storage part 10 is thus prevented from flowing outwardly during power supply to the vehicle V.

As illustrated in FIG. 5, the power transmission circuit part 21, the power transmission coil part 22, and the cable 23 of the power supply part 20 heat up during power supply. Here, the power transmission circuit part 21 is installed in a low position inside the storage part 10 or on the floor surface R thereof. The power transmission coil part 22 and the cable 23 are installed on the floor surface R or embedded in the floor surface R. Thus, cold air in the vicinity of the floor surface R of the storage part 10 is warmed by the power transmission circuit part 21, the power transmission coil part 22, and the cable 23 heating up, and rises due to convection.

In the vehicle V, the power reception coil part 51, the power reception circuit part 52, and the battery 53 also heat up when receiving power from the power supply part 20. The power reception coil part 51 is provided on the lower surface of the vehicle V. The power reception circuit part 52 and the battery 53 are also often provided in a low position of the vehicle V. Thus, cold air in the vicinity of the floor surface R of the storage part 10 is warmed by the power reception coil part 51, the power reception circuit part 52, and the cable 53, and rises due to convection.

Some vehicles V may forcibly externally discharge, from the vehicle V, the air warmed by the power reception coil part 51, the power reception circuit part 52, and the battery 53 by a fan. Even in this case, the warmed air that is externally discharged from the vehicle V also rises inside the storage part 10 due to convection. Additionally, some vehicles V may absorb the heat of the power reception coil part 51, the power reception circuit part 52, and the battery 53 with a refrigerant such as water, and radiate the heat absorbed by the refrigerant using a radiator facing outward of the vehicle V. Even in this case, the air inside the storage part 10 is warmed by the radiation of heat from the radiator, and the warmed air rises inside the storage part 10 due to convection.

As explained above, all of the heat generated during power supply to the vehicle V (heat generated by the power transmission circuit part 21, the power transmission coil part 22, the cable 23, the power reception coil part 51, the power reception circuit part 52, and the battery 53) is used to warm the air inside the storage part 10, and the warmed air rises inside the storage part 10 due to convection.

The evaporator 31 of the heat pump 3 is installed in a position close to the ceiling 10*c* of the storage part 10. The evaporator 31 is thus capable of coining into contact with the warmed air that has risen by convection and recovering heat from the warmed air. The recovered heat is radiated from the condenser 33 of the heat pump 3, and can warm the building T.

When the heat is recovered by the evaporator 31, the air is cooled, and the cooled air descends to the vicinity of the floor surface R of the storage part 10 due to convection. The air is thus circulated by convection inside the storage part 10 due to changes in the temperature of the air. Consequently, both the heat generated by the power supply part 20 (power transmission circuit part 21, power transmission coil part 22, and cable 23) and the heat generated by the charging unit 5 (power reception coil part 51, power reception circuit part 52, and battery 53) of the vehicle V during power supply to the vehicle V can be efficiently recovered by the evaporator 31.

When there is a plurality of the vehicles V waiting to be supplied with power, the vehicle power supply system 1 supplies power to the plurality of the vehicles V in succession inside the storage part 10. The air inside the storage part 10 is thus constantly heated, and the heat can be efficiently recovered by the evaporator 31 of the heat pump 3.

The flow of a power supply process to the vehicle V performed by the power supply control device 4 of the vehicle power supply system 1 will be described next. The process performed by the power supply control device 4 will be described below by dividing the process into task 1 and task 2. Task 1 is a process of managing the vehicle V waiting to be supplied with power, and guiding the same to the power supply area P. Task 2 is a process of supplying power to the vehicle V that has arrived at the power supply area P, and moving the vehicle V to the power supply-completed area A3. Dividing the power supply process into tasks 1 and 2 enables appropriate management of the vehicles V waiting to be supplied with power that have arrived at the power supply waiting area A1 (management in a case in which the number of the vehicles V waiting to be supplied with power increases) during power supply while supplying power to the vehicle V. Tasks 1 and 2 can be performed in parallel. Task 2 is performed when an activation condition for task 2 is met during task 1.

Task 1 will first be described using the flowchart of FIG. 8. It should be noted that when the process shown in FIG. 8 reaches END, it starts again from START after a predetermined time. The predetermined time may be zero, so that the process starts again from START immediately after it reaches END. As shown in FIG. 8, the waiting list generation part 42 determines whether the communication part 40 has received the power supply request signal transmitted from the vehicle V (S101). If the power supply request signal has been received (S101: YES), the waiting list generation part 42 adds the vehicle ID received together with the power supply request signal to the waiting list (S102).

If the power supply request signal has not been received (S101: NO), the waiting list generation part 42 determines whether the waiting list is empty (S103). If the waiting list is empty (S103: YES), the power supply control device 4 ends the process, and starts the process again from START after the predetermined time.

After the vehicle ID is added to the waiting list in S102 or when the waiting list is not empty (S103: NO), the waiting list generation part 42 determines whether the vehicle sensor S2 detects that there is no vehicle V in the storage part 10 (power supply area P) (S104). If it is detected that there is a vehicle V (S104: NO), the power supply control device 4 ends the process, and starts the process again from START after the predetermined time.

If it is detected that there is no vehicle V (S104: YES), the waiting list generation part 42 selects one vehicle ID to be supplied with power from the vehicle IDs recorded in the waiting list (S105). After selecting the vehicle ID, the waiting list generation part 42 removes the selected vehicle ID from the waiting list (S106).

Next, the guide control part 43 turns on the temporary stop guide light L2 indicating the temporary stop area A2 (S107). The guide control part 43 also transmits the entry instruction signal to enter the temporary stop area A2 to the vehicle V of the vehicle ID selected by the waiting list generation part 42 (S108). The vehicle V to be supplied with power is thus capable of travelling autonomously from the power supply waiting area A1 to the temporary stop area A2 with the temporary stop guide light L2 that is emitting light as a guide.

The guide control part 43 determines whether the vehicle V to be supplied with power has arrived at the temporary stop area A2 (S109). The guide control part 43 is capable of determining whether the vehicle V has arrived at the temporary stop area A2 on the basis of the arrival signal transmitted by the vehicle V. If the vehicle V has not arrived at the temporary stop area A2 (S109: NO), the guide control part 43 repeats the process of S109 until the vehicle V arrives.

If the vehicle V to be supplied with power has arrived at the temporary stop area A2 (S109: YES), the guide control part 43 turns the storage part guide light L1 on (S110), and the open-and-close control part 44 controls the entrance door 11 to be open (S111). Thus, the entrance door 11 is opened, and the storage part guide light L1 can be observed from the vehicle V to be supplied with power that is stopped in the temporary stop area A2. The guide control part 43 transmits the entry instruction signal to enter the power supply area P to the vehicle V to be supplied with power that is stopped in the temporary stop area A2 (S112), and turns the temporary stop guide light L2 off (S113).

The guide control part 43 then determines whether the vehicle V to be supplied with power has arrived at the power supply area P (S114). The guide control part 43 is capable of determining whether the vehicle V has arrived at the power supply area P on the basis of the arrival signal transmitted by the vehicle V. If the vehicle V has not arrived at the power supply area P (S114: NO), the guide control part 43 repeats the process of S114 until the vehicle V arrives.

If the vehicle V to be supplied with power has arrived at the power supply area P (S114: YES), the open-and-close control part 44 controls the entrance door 11 to be closed (S115), and the guide control part 43 turns the storage part guide light L1 off (S116). In other words, the guide control part 43 turns the storage part guide light L1 off so that the storage part guide light L1 is turned off when the entrance door 11 and the exit door 13 are closed. The preparation for power supply to the vehicle V is thus completed. Next, the power supply control device 4 activates task 2 (S117). The power supply control device 4 then starts the process of task 2 in parallel with the process of task 1. After the process of S117 ends, the power supply control device 4 starts the process of task 1 again from START after the predetermined time.

Figure 9:
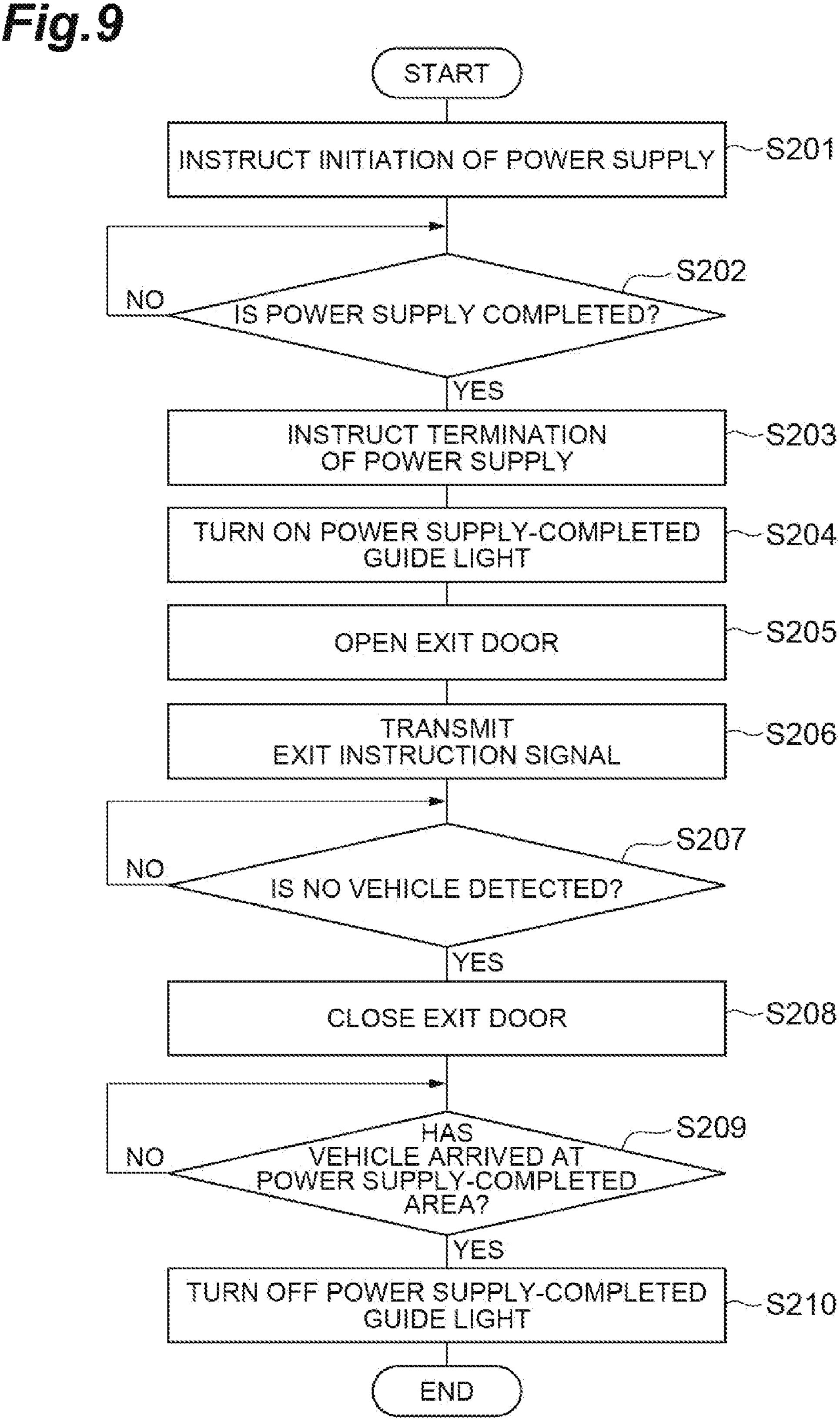
FIG. 9 is a flow chart illustrating the flow of task 2 of the power supply process performed by the power supply control device.

Task 2 will be described next using the flowchart of FIG. 9. It should be noted that when task 2 is activated in S117 of task 1, the process shown in FIG. 9 is performed, and when the process reaches END, the process ends. Since task 1 is repeatedly performed, each time S117 of task 1 is performed, task 2 is activated and performed once. As shown in FIG. 9, when task 2 is activated, the power supply control part 45 instructs the power supply part 20 to start supplying power to the vehicle V, and power supply to the vehicle V starts (S201). The power supply control part 45 determines whether the power supply is completed on the basis of whether the power supply-completed condition has been met (S202). If the power supply is not completed (S202: NO), the power supply control part 45 repeats the process of S202 until it is determined that the power supply is completed.

If the power supply is completed (S202: YES), the power supply control part 45 instructs the power supply part 20 to stop the power supply (S203), and the guide control part 43 turns on the power supply-completed guide light L3 in the power supply-completed area A3 (S204). The open-and-close control part 44 controls the exit door 13 to be open (S205). Thus, the exit door 13 is opened, and the power supply-completed guide light L3 can be observed from the vehicle V for which power supply is completed that is stopped in the power supply area P.

The guide control part 43 transmits the exit instruction signal to the vehicle V for which power supply is completed (S206). Thus, the vehicle V for which power supply is completed is capable of travelling autonomously to the power supply-completed area A3 with the power supply-completed guide light L3 that is emitting light as a guide.

The open-and-close control part 44 determines whether the vehicle sensor S2 detects that there is no vehicle V in the storage part 10 (power supply area P) (S207). If it is detected that there is a vehicle V (S207: NO), the open-and-close control part 44 repeats the process of S207 until it is detected that there is no vehicle V. If it is detected that there is no vehicle V (S207: YES), the open-and-close control part 44 controls the exit door 13 to be closed (S208).

The guide control part 43 determines whether the vehicle V for which power supply is completed has arrived at the power supply-completed area A3 (S209). The guide control part 43 is capable of determining whether the vehicle V has arrived at the power supply-completed area A3 on the basis of the arrival signal transmitted by the vehicle V. If the vehicle V has not arrived at the power supply-completed area A3 (S209: NO), the guide control part 43 repeats the process of S209 until the vehicle V arrives. If the vehicle V has arrived at the power supply-completed area A3 (S209: YES), the guide control part 43 turns the power supply-completed guide light L3 off (S210), and the power supply control device 4 ends the process of task 2.

The flow of a charging process performed by the vehicle V will be described next. It should be noted that the charging process shown in FIG. 10 starts when a vehicle V that is to charge the battery 53 arrives at the power supply waiting area A1. When the process shown in FIG. 10 reaches END, one cycle of the process ends.

When the vehicle V arrives at the power supply waiting area A1, the charge control part 62 of the charge control device 6 transmits the power supply request signal to the power supply control device 4 as shown in FIG. 10 (S301). In doing so, the charge control part 62 also transmits the vehicle ID with the power supply request signal. The autonomous driving device 7 determines whether the communication part 60 has received the entry instruction signal to enter the temporary stop area A2 from the power supply control device 4 (S302). If the entry instruction signal has not been received (S302: NO), the autonomous driving device 7 repeats the process of S302 until the entry instruction signal is received.

If the entry instruction signal has been received (S302: YES), the autonomous driving device 7 causes the vehicle V to travel autonomously to the temporary stop area A2 on the basis of an image of the temporary stop guide light L2 captured by the camera 71 (S303). When the vehicle V arrives at the temporary stop area A2, the charge control part 62 transmits the arrival signal indicating that the vehicle V has arrived at the temporary stop area A2 to the power supply control device 4 (S304). The autonomous driving device 7 then determines whether the entry instruction signal to enter the power supply area P has been received (S305). If the entry instruction signal has not been received (S305: NO), the autonomous driving device 7 repeats the process of S305 until the entry instruction signal is received.

If the entry instruction signal to enter the power supply area P has been received (S305: YES), the autonomous driving device 7 causes the vehicle V to travel autonomously to the power supply area P on the basis of an image of the storage part guide light L1 captured by the camera 71 (S306). When the vehicle V arrives at the power supply area P, the charge control part 62 transmits the arrival signal indicating that the vehicle V has arrived at the power supply area P to the power supply control device 4 (S307).

The charge control part 62 controls the charging unit 5 so that power from the power supply part 20 is received by the power reception coil part 51, and the power converted into an appropriate voltage by the power reception circuit part 52 is supplied to the battery 53 to charge the battery 53 (S308). The charge control part 62 then determines whether the exit instruction signal has been received from the power supply control device 4 (S309). If the exit instruction signal has not been received (S309: NO), the charge control part 62 repeats the process of S309 until the exit instruction signal is received.

If the exit instruction signal has been received (S309: YES), the autonomous driving device 7 causes the vehicle V to travel autonomously to the power supply-completed area A3 on the basis of an image of the power supply-completed guide light L3 captured by the camera 71 (S310). When the vehicle V arrives at the power supply-completed area A3, the charge control part 62 transmits the arrival signal indicating that the vehicle V has arrived at the power supply-completed area A3 to the power supply control device 4 (S311). After the arrival signal is transmitted, the vehicle V ends the charging process.

As described above, in the vehicle power supply system 1, the space inside and outside the storage part 10 can be separated by having the storage part 10 for storing the vehicle V. The vehicle power supply system 1 is thus capable of keeping the heat generated during power supply to the vehicle V within the storage part 10, and efficiently recovering the heat inside the storage part 10 by the evaporator 31 of the heat pump 3. The vehicle power supply system 1 is then capable of transferring the recovered heat to the condenser 33 of the heat pump 3, and supplying the heat to the building T from the condenser 33. Consequently, the vehicle power supply system 1 is capable of efficiently recovering and using the heat generated during power supply to the vehicle V.

Additionally, the vehicle V is capable of travelling autonomously and receiving power inside the storage part 10. Thus, in the vehicle power supply system 1, the heat generated during power supply can be recovered and supplied to the building T without manual intervention. It is also unnecessary for a person to enter the storage part 10 and drive the vehicle V. The temperature inside the storage part 10 during power supply may thus rise to a level at which a person feels hot. This allows the temperature around the evaporator 31 to be high, so that the efficiency of the heat pump 3 can be improved and the heat can be efficiently supplied to the building T.

The vehicle power supply system 1 uses the heat pump 3 as a device for recovering the heat inside the storage part 10 and supplying the same to the building T. In this case, the vehicle power supply system 1 is capable of more efficiently recovering the heat inside the storage part 10 and supplying the same to the building T using the heat pump 3 even when the temperature of the building T is higher than the temperature inside the storage part 10.

The evaporator 31 of the heat pump 3 is installed in a position closer to the ceiling 10*c* of the storage part 10 than to the floor surface R of the storage part 10. Warm air tends to accumulate in an upper position inside the storage part 10. Thus, in the vehicle power supply system 1, the heat inside the storage part 10 can be more efficiently recovered by installing the evaporator 31 in a position close to the ceiling 10*c*.

The power transmission coil part 22 of the power supply part 20 is installed inside the storage part 10. The power transmission coil part 22 may heat up when power is supplied wirelessly to the vehicle V. Thus, in the vehicle power supply system 1, the heat generated by the power transmission coil part 22 can be efficiently recovered by the evaporator 31 by installing the power transmission coil part 22 that heats up during power supply inside the storage part 10. In this embodiment, the power transmission circuit part 21 and the cable 23 are also installed inside the storage part 10. Thus, in the vehicle power supply system 1, the heat generated by the power transmission circuit part 21 and the cable 23 can also be efficiently recovered by the evaporator 31.

The entrance 10*a* and the exit 10*b* of the storage part 10 are provided with the entrance door 11 and the exit door 13, respectively. In this case, the vehicle power supply system 1 enables entry and exit of the vehicle V into and out of the storage part 10 through the entrance 10*a* and the exit 10*b* by opening the entrance door 11 and the exit door 13, and is capable of preventing the heat inside the storage part 10 from being released externally through the entrance 10*a* and the exit 10*b* by closing the entrance door 11 and the exit door 13.

The guide control part 43 turns the storage part guide light L1 on so that the storage part guide light L1 is on when the entrance door 11 is open and there is no vehicle V inside the storage part 10. The guide control part 43 turns the storage part guide light L1 off so that the storage part guide light L1 is off when the entrance door 11 and the exit door 13 are closed. In this case, the vehicle power supply system 1 is capable of reducing the energy required to keep the storage part guide light L1 on by turning the storage part guide light L1 on only when the vehicle V needs to be guided with the storage part guide light L1, and otherwise turning the storage part guide light L1 off.

When the temperature measured by the thermometer S1 is equal to or higher than the predetermined temperature threshold, the open-and-close control part 44 controls at least one of the entrance door 11 or the exit door 13 to be open. In this case, the vehicle power supply system 1 is capable of externally discharging hot air inside the storage part 10 (ventilating the storage part 10) by opening at least one of the entrance 10*a* or the exit 10*b*. The vehicle power supply system 1 is thus capable of preventing the temperature inside the storage part 10 from rising too high.

In this embodiment, the entrance 10*a* and the exit 10*b* face each other. The open-and-close control part 44 is thus capable of efficiently discharging the hot air inside the storage part 10 by opening the entrance door 11 and the exit door 13 at the same time.

When the temperature measured by the thermometer S1 is equal to or higher than the predetermined temperature threshold, the ventilation control part 48 operates the ventilator 15 to externally discharge the air inside the storage part 10. In this case, the vehicle power supply system 1 is capable of preventing the temperature inside the storage part 10 from rising too high by operating the ventilator 15.

When the temperature measured by the thermometer S1 is equal to or higher than the predetermined temperature threshold, the power supply control part 45 may reduce the power supply capacity from the power supply part 20 to the vehicle V. In this case, the vehicle power supply system 1 is capable of preventing the generation of heat in the power supply part 20 and the charging unit 5.

Additionally, when the temperature measured by the thermometer S1 is equal to or higher than the predetermined temperature threshold, the vehicle power supply system 1 may combine and perform one or more of the control to open the entrance door 11 and/or the exit door 13, the control to operate the ventilator 15, and the control to reduce the power supply capacity described above.

The open-and-close control part 44 determines whether the battery 53 onboard the vehicle V is in the abnormal state on the basis of the battery state information acquired by the battery information acquisition part 47. When the battery 53 is in the abnormal state, the open-and-close control part 44 controls at least one of the entrance door 11 or the exit door 13 to be open. In this case, the vehicle power supply system 1 is capable of opening at least one of the entrance 10*a* or the exit 10*b* to enable the state of the vehicle V inside the storage part 10 to be easily observed from outside. The vehicle power supply system 1 is also capable of ventilating the storage part 10 by opening at least one of the entrance door 11 or the exit door 13.

When it is determined that the battery 53 is in the abnormal state, the ventilation control part 48 may operate the ventilator 15 to ventilate the storage part 10.

The vehicle power supply system 1 is capable of supplying power to a plurality of vehicles V in succession. The waiting list generation part 42 generates a waiting list of the vehicles V waiting to be supplied with power. When there is a vehicle V waiting to be supplied with power on the waiting list, the heat supply control part 46 maintains the supplying state of heat to the building T of the heat pump 3. That is, the heat supply control part 46 maintains the supplying state of heat to the building T (i.e., continues operation) of the heat pump 3 even when power supply is stopped to change the vehicle V to be supplied with power inside the storage part 10. In this case, the vehicle power supply system 1 is capable of continuing to supply heat to the building T even while the vehicle V in the storage part 10 is being changed when there is a vehicle V waiting to be supplied with power.

When there is a vehicle V waiting to be supplied with power, the time during which power supply is stopped (the time during which the air inside the storage part 10 is not heated) is T1+T2, T1 being a time from when the vehicle V for which power supply is completed starts to move from the power supply area P toward the power supply-completed area A3 to when the vehicle V exits the storage part 10 (the vehicle sensor S2 does not detect the vehicle V) (corresponding to process steps S203 to S208 in FIG. 9), and T2 being a time from when the vehicle V waiting to be supplied with power leaves the power supply waiting area A1 to when the vehicle V arrives at the power supply area P and starts receiving power (corresponding to process steps S105 to S117 in FIG. 8, and process step S201 in FIG. 9). If it is assumed that the power supply waiting area A1, the temporary stop area A2, and the storage part 10 are provided within 100 in, and the vehicle V travels at a speed of 3 m/sec., this time (T1+T2) is as short as one minute or less. The time during which the warmed air inside the storage part 10 flows out of the storage part 10 through the entrance 10*a* or the exit 10*b* is T3+T4, T3 being a time during which the exit door 13 is open (corresponding to process steps S205 to S208 in FIG. 9), and T4 being a time during which the entrance door 11 is open (corresponding to process steps S111 to S115 in FIG. 8). Due to the fewer number of process steps, T3 is shorter than T1 and T4 is shorter than T2, so that T3+T4 is even shorter than T1+T2. Thus, the reduction in the temperature inside the storage part 10 is small even while the vehicle V in the storage part 10 is being changed, and the supply of heat to the building T can be efficiently continued.

Although the embodiments of the present disclosure have been described above, the present disclosure is not limited there to. For example, a fan may be provided in a position close to the ceiling 10*c* of the storage part 10, and the warm air in an upper part of the storage part 10 may be applied to the evaporator 31 by operating the fan. In this case, the vehicle power supply system 1 is capable of accelerating the recovery of heat by the evaporator 31.

Additionally, for example, the warm air inside the storage part 10 may flow out from the entrance 10*a* when the entrance door 11 is open. The vehicle power supply system 1 may thus be provided with an air curtain in the vicinity of the entrance 10*a* to prevent the warm air from flowing out from the entrance 10*a* when the entrance door 11 is open. Similarly, the vehicle power supply system 1 may be provided with an air curtain in the vicinity of the exit 10*b* to prevent the warm air from flowing out. Alternatively, in the vehicle power supply system 1, the entrance door 11 and the exit door 13 may each be a series of two doors. In this case, the warm air is also prevented from flowing out.

It may be contemplated that the temperature inside the vehicle V immediately after the vehicle V has exited the storage part 10 when power supply is completed is higher than a temperature at which a person feels comfortable. In this case, the vehicle V may automatically open the windows for ventilation after exiting the storage part 10 to lower the temperature therein.

Figure 11:
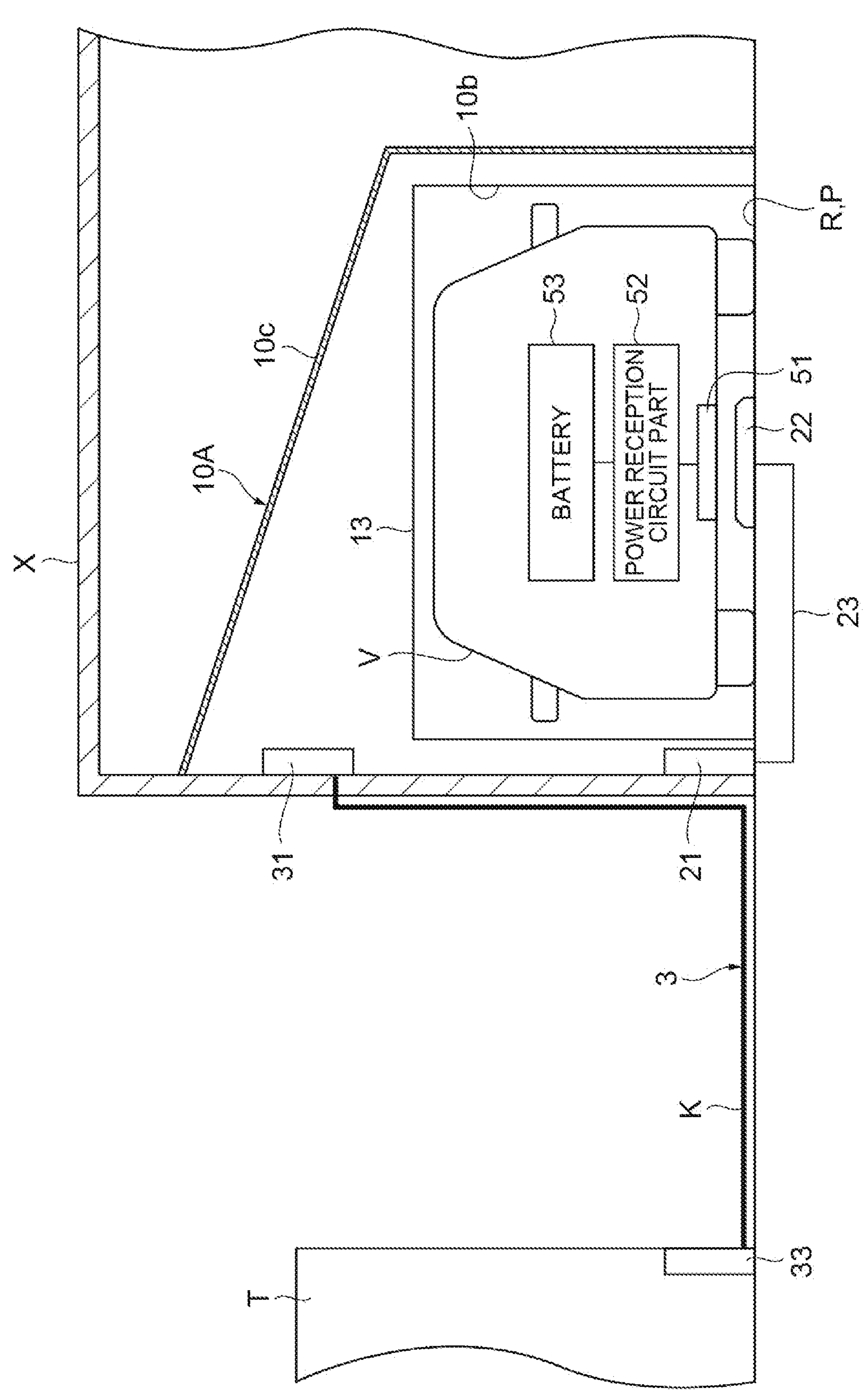
FIG. 11 is a schematic cross-sectional view illustrating a configuration of the storage part according to a first variation.

Various variations of the storage part 10 will be described next. As illustrated in FIG. 11, a storage part 10A according to a first variation may be achieved by surrounding a portion of the inside of a large building X such as a parking garage with a simple structure. In the storage part 10A, the ceiling 10*c* and walls are formed, for example, of highly heat insulating sheets. Similarly to the storage part 10 of the embodiments, the storage part 10A is also provided with the entrance 10*a* and the exit 10*b*, and further with the entrance door 11 that opens and closes the entrance 10*a* and the exit door 13 that opens and closes the exit 10*b*. The entrance door 11 and the exit door 13 may, for example, be a type of door that opens the entrance 10*a* and the exit 10*b*, respectively, by rolling up a sheet from above. For example, a vapor-deposited aluminum heat resistant foam sheet may be used as a material of the sheet forming the storage part 10A.

Additionally, the ceiling 10*c* of the storage part 10A may, for example, be sloped so that the ceiling 10*c* is higher at a side in which the evaporator 31 is installed. In this case, by having the sloped ceiling 10*c*, the storage part 10A is capable of efficiently guiding the warmed air that has risen to the evaporator 31 without using a fan or the like.

Figure 12:
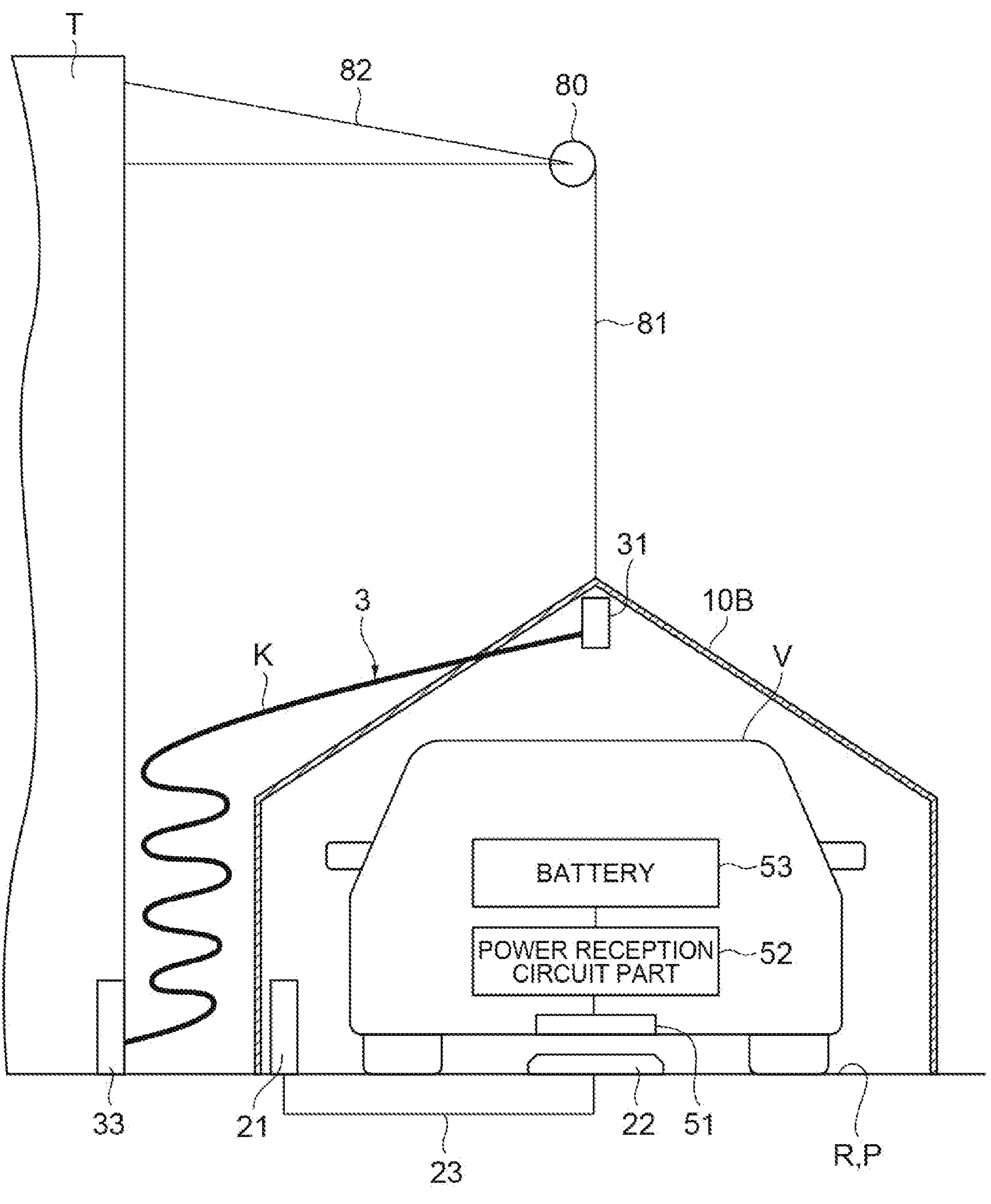
FIG. 12 is a schematic cross-sectional view illustrating the configuration of the storage part according to a second variation.
Figure 13:
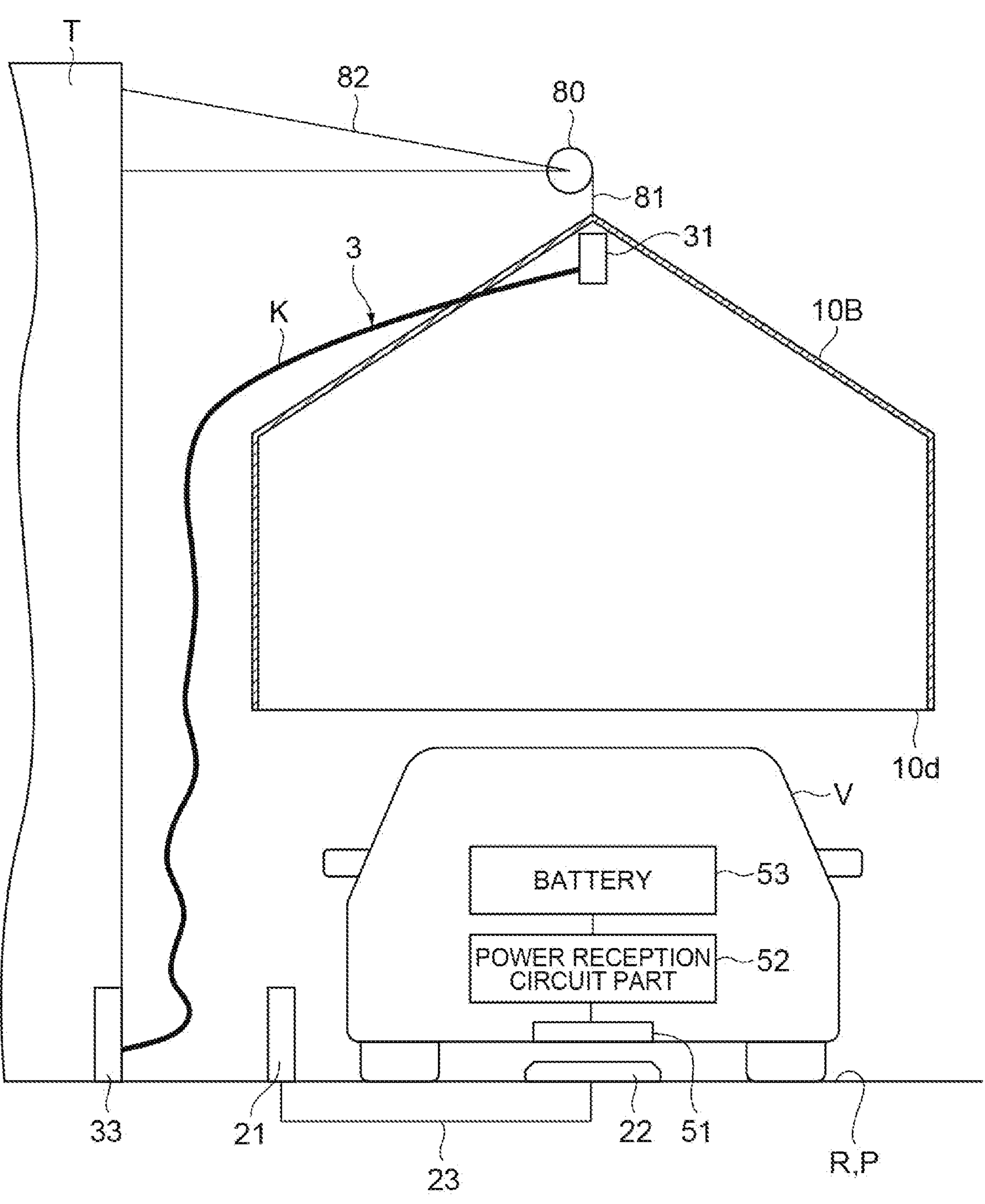
FIG. 13 is a schematic cross-sectional view illustrating the configuration of the storage part according to the second variation.

Furthermore, as illustrated in FIGS. 12 and 13, a storage part 10B according to a second variation may have a shape that covers the vehicle V from above, and may be capable of being raised and lowered. FIG. 12 illustrates the storage part 10B in a lowered position, and FIG. 13 illustrates the storage part 10B in a raised position. As illustrated in FIG. 13, a lower part of the storage part 10B is open. That is, a lower opening of the storage part 10B is an ingress-egress point 10*d* for the vehicle V. A wire 81 is connected to a top part of the storage part 10B. The storage part 10B is raised by winding the wire 81 with a winch 80 at a position above the storage part 10B.

The winch 80 is thus capable of raising and lowering the storage part 10B. As illustrated in FIG. 13, the ingress-egress point 10*d* of the storage part 10B is opened by the winch 80 raising the storage part 10B so that the lower opening of the storage part 10B is positioned higher than the roof of the vehicle V. This enables the vehicle V to enter and exit the power supply area P.

For example, the winch 80 that raises the storage part 10B is installed in a position above the storage part 10B by a support member 82 installed in the building T. However, the winch 80 may be supported by an independent support pole or the like separate from the building T.

Additionally, the ceiling of the storage part 10B is high at the center portion in a width direction of the vehicle V to be stored. The evaporator 31 is installed on the lower surface of the ceiling of the storage part 10B in the portion where the ceiling is high. In other words, the evaporator 31 is raised and lowered together with the storage part 10B. The pipe K (pipe connecting the evaporator 31 to the condenser 33) of the heat pump 3 is a flexible pipe. For example, a vapor-deposited aluminum heat resistant foam sheet may be used as a material of the cover forming the storage part 10B.

In the case in which the storage part 10B according to the second variation is used, power is supplied to the vehicle V with the vehicle V being covered from above with the storage part 10B as illustrated in FIG. 12. The air warmed by the heat generated during power supply can thus be prevented from flowing out of the storage part 10B. The storage part 10B according to the second variation is thus capable of even more efficiently recovering the heat.

Although the cable 23 connecting the power transmission circuit part 21 to the power transmission coil part 22 is illustrated in FIG. 12, etc., as being embedded in the floor surface R, the cable 23 may be laid on the floor surface R to facilitate the installation of the cable 23. In this case, it is only required that the cable 23 is strong enough to be driven over by the vehicle V.

Figure 14:
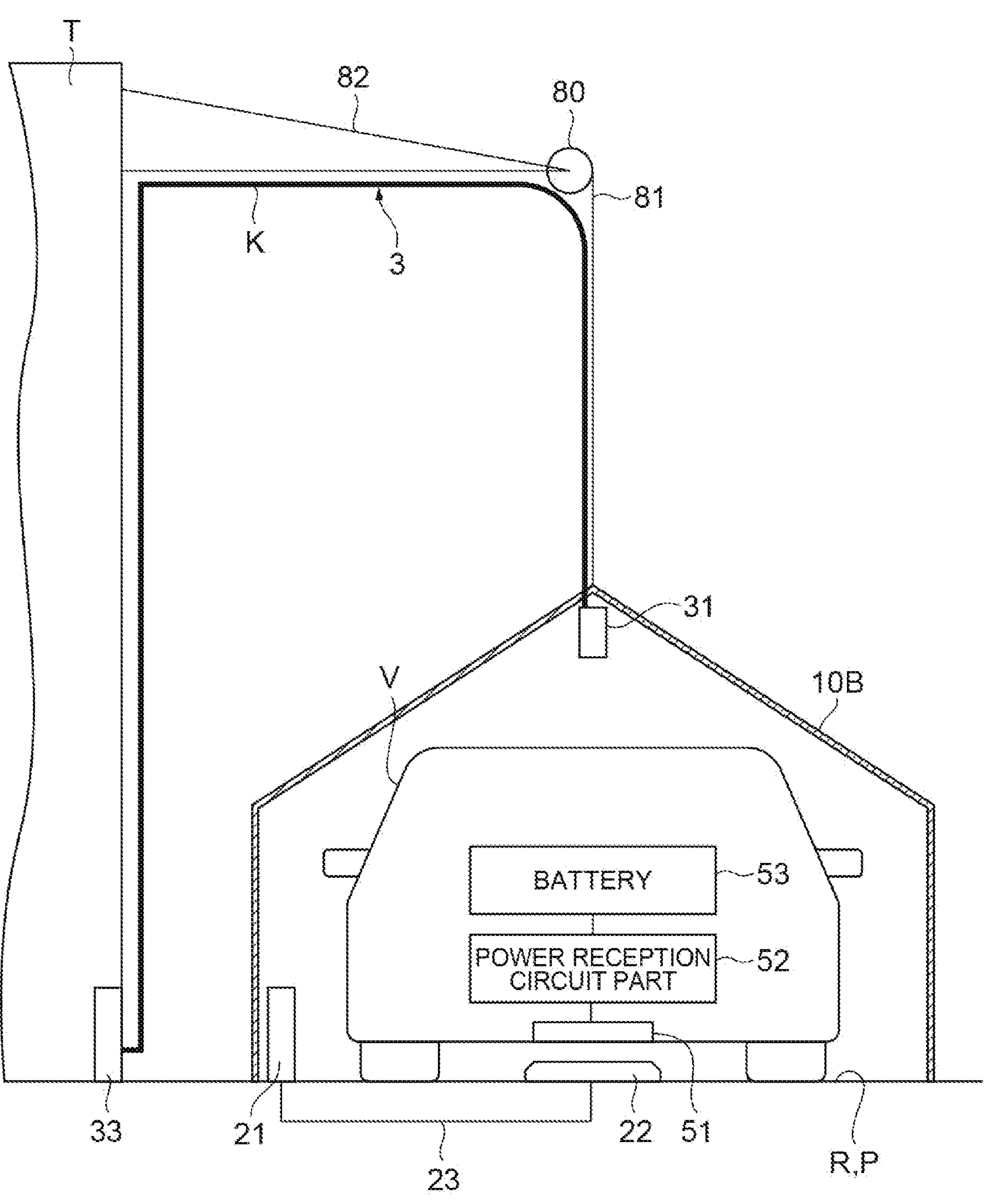
FIG. 14 is a schematic cross-sectional view illustrating a variation of a configuration around a pipe of the storage part according to the second variation.
Figure 15:
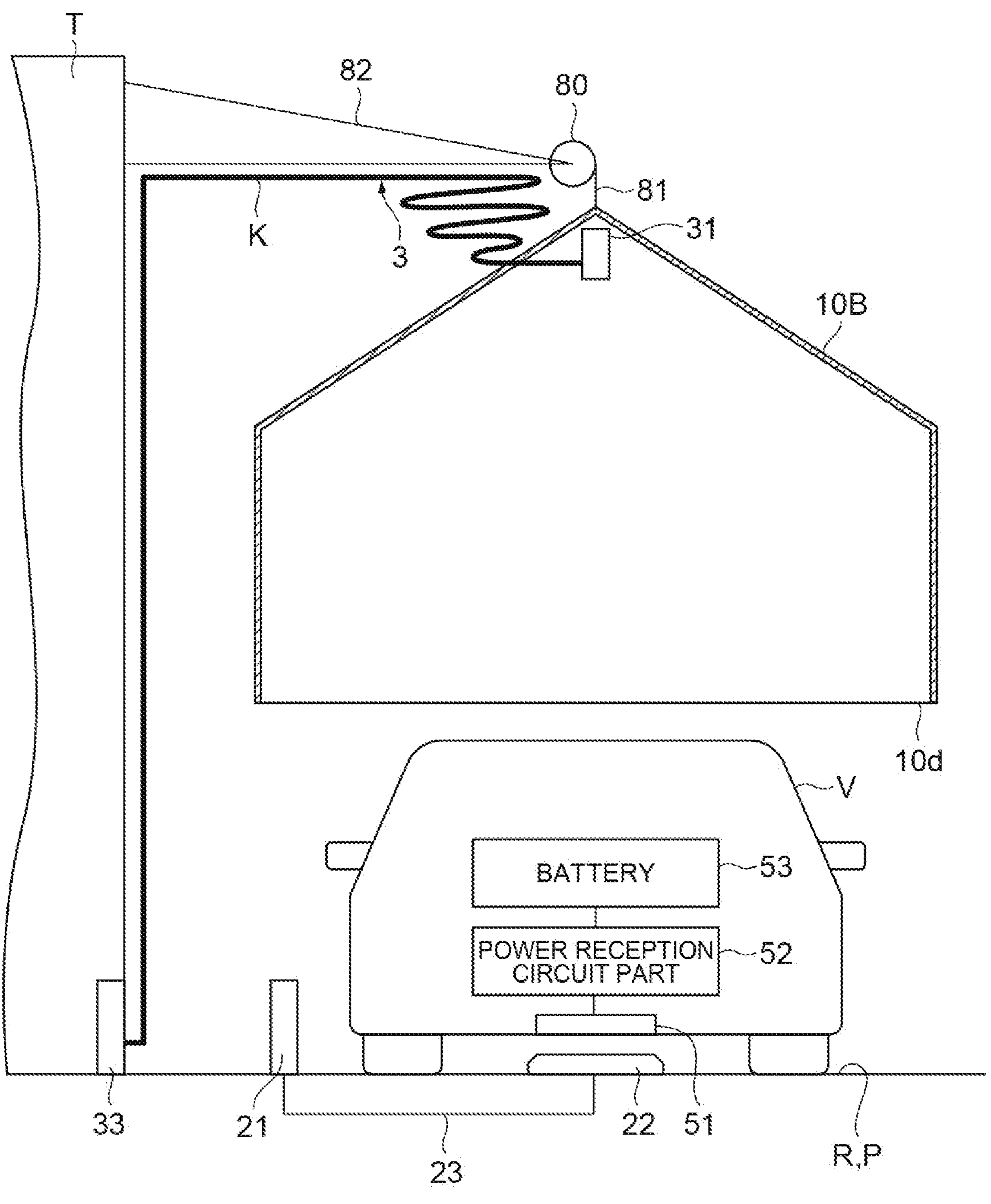
FIG. 15 is a schematic cross-sectional view illustrating a variation of the configuration around the pipe of the storage part according to the second variation.

As illustrated in FIGS. 14 and 15, the pipe K connecting the evaporator 31 to the condenser 33 may be a fixed pipe in which the portion from the winch 80 to the condenser 33 is fixed to the support member 82 and the building T. In this case, the portion of the pipe K from the winch 80 to the evaporator 31 is a flexible pipe. FIG. 14 illustrates the storage part 10B in the lowered position, and FIG. 15 illustrates the storage part 10B in the raised position (the ingress-egress point 10*d* of the storage part 10B is open).

Figure 16:
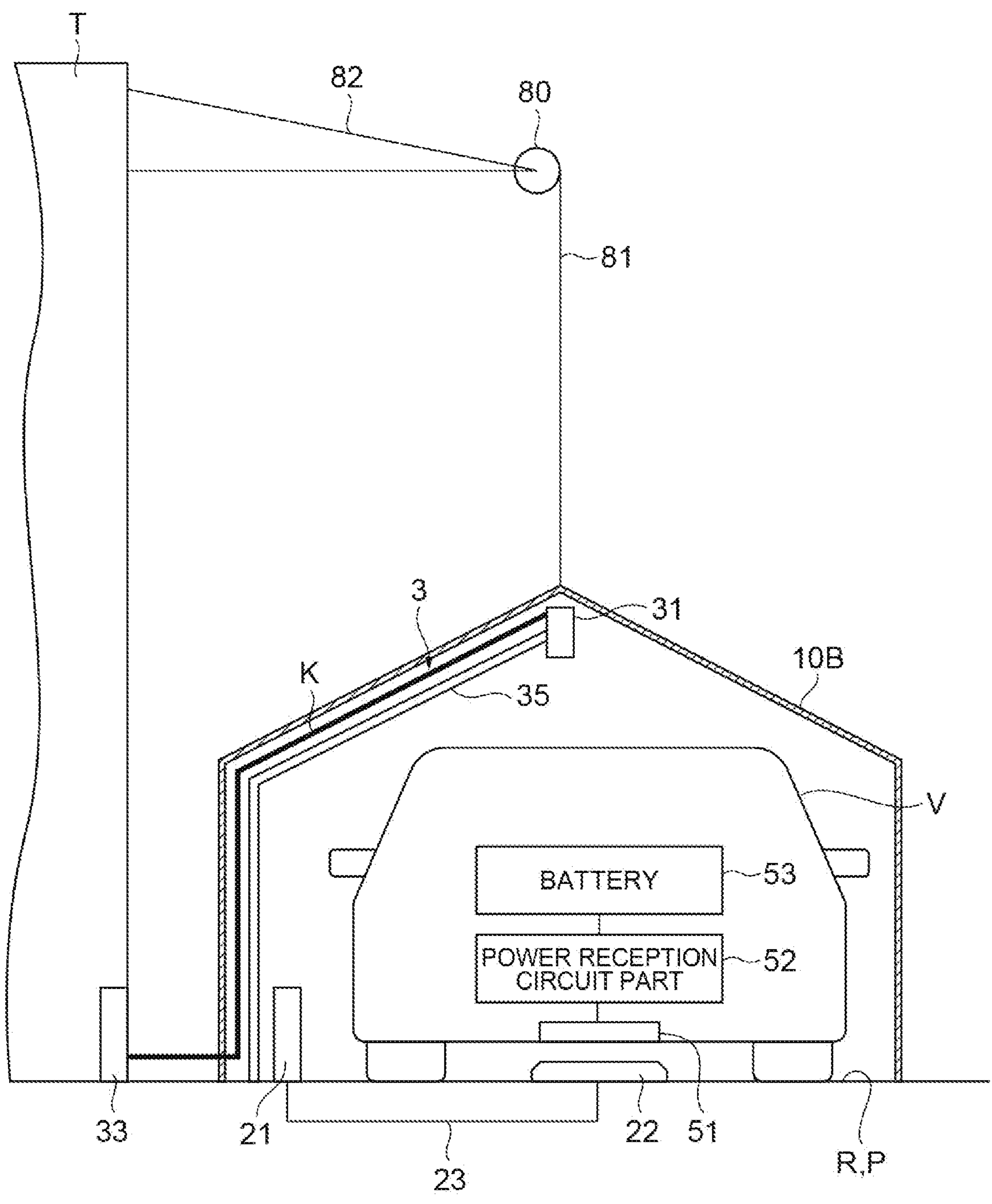
FIG. 16 is a schematic cross-sectional view illustrating a variation of the configuration around the pipe of the storage part according to the second variation.
Figure 17:
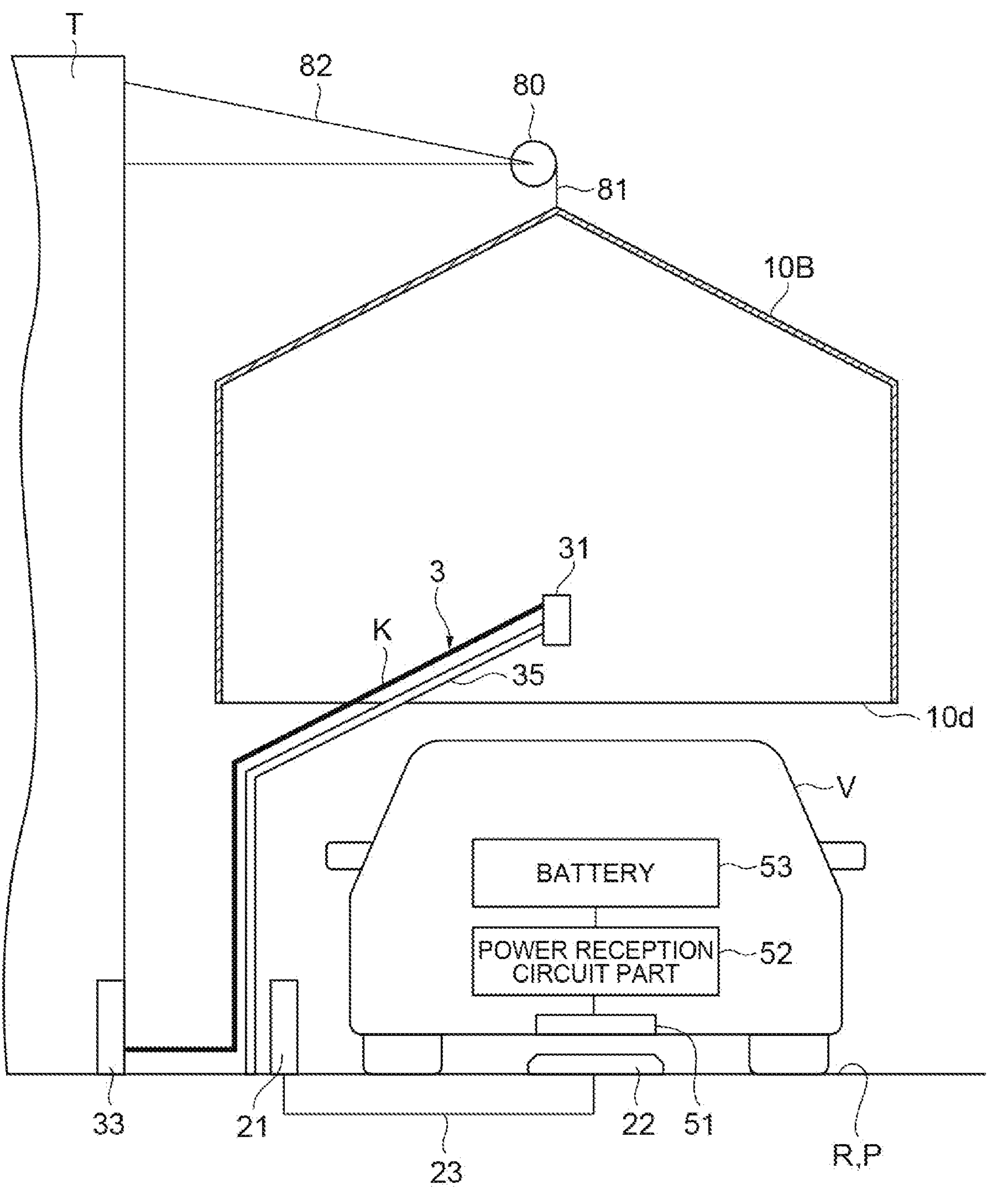
FIG. 17 is a schematic cross-sectional view illustrating a variation of the configuration around the pipe of the storage part according to the second variation.

Additionally, as illustrated in FIGS. 16 and 17, the evaporator 31 may by supported by a support pole 35 so that the evaporator 31 is positioned in a high portion of the ceiling inside the storage part 10B. In this case, the pipe K connecting the evaporator 31 to the condenser 33 may be a fixed pipe fixed to the support pole 35. In other words, the evaporator 31 does not move together with the storage part 10B when the storage part 10B is raised as illustrated in FIG. 17. Even in this case, the evaporator 31 is also capable of efficiently recovering the heat inside the storage part 10B. FIG. 16 illustrates the storage part 10B in the lowered position, and FIG. 17 illustrates the storage part 10B in the raised position (the ingress-egress point 10*d* of the storage part 10B is open).

Although the vehicle power supply system 1 according to the embodiments above is described, for example, as having one storage part 10 as illustrated in FIG. 1, the number of the storage part 10 is not limited to one. For example, there may be a plurality of the storage parts 10 that supply power, such as a vehicle power supply system 1A illustrated in FIG. 18. In this case, the temporary stop area A2 and the temporary stop guide light L2 are positioned before each of the plurality of the storage parts 10.

Figure 18:
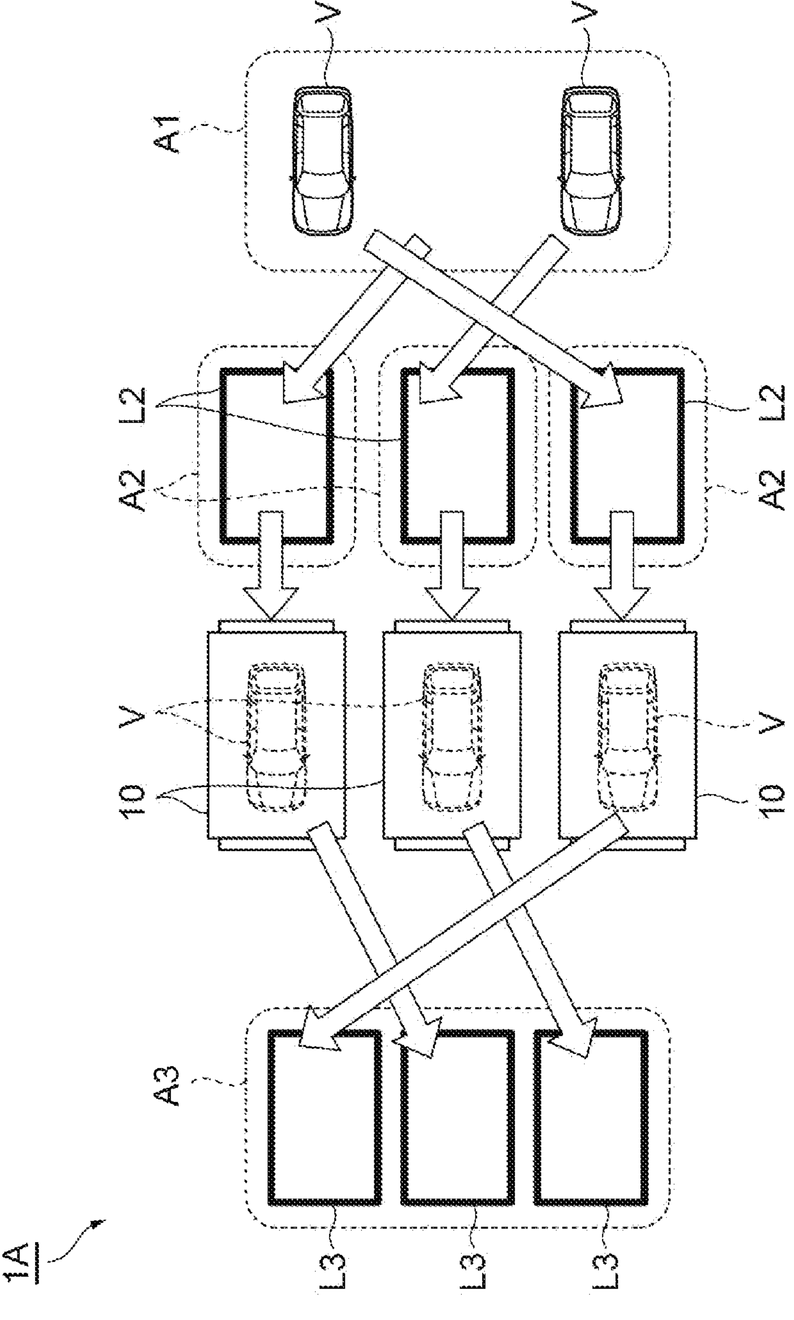
FIG. 18 is a plan view illustrating a layout in a configuration relating to the movement of vehicles in the vehicle power supply system having a plurality of the storage parts.

For example, in the example illustrated in FIG. 18, there are three storage parts 10 as well as three temporary stop areas A2 and three temporary stop guide lights L2 to correspond to the number of the storage parts 10. In this case, the three temporary stop guide lights L2 may emit light in different colors (for example, white, red, and green) so that they are distinguishable from the vehicle V stopped in the power supply waiting area A1. The vehicle power supply system 1A is thus capable of supplying power simultaneously to a plurality of vehicles V in the plurality of the storage parts 10.

The storage part 10 according to the embodiments above need not have the entrance 10*a* and the exit 10*b*. For example, the storage part 10 may have one ingress-egress point. In this case, the storage part 10 may have one door that opens and closes the ingress-egress point. Similarly, the storage part 10A according to the first variation may also have one ingress-egress point and one door.

The storage part 10 may be an independent structure, or may be a room inside a building that has a plurality of rooms.

As described using FIG. 1, the vehicle power supply system 1 has the temporary stop area A2, but the vehicle power supply system 1 need not have the temporary stop area A2. Additionally, the vehicle power supply system 1 has the power supply waiting area A1 and the power supply-completed area A3, but the power supply waiting area A1 and the power supply-completed area A3 may be the same area. The vehicle power supply system 1A described as a variation may also have a similar configuration.

For example, all or a portion of the storage part 10, 10A, or 10B and the entrance door 11 may be formed of a material that is capable of transmitting light of a wavelength band that is detectable by the camera 71 (for example, visible light or near infrared light) and is highly heat insulating (for example, double glazing or transparent heat insulating sheet), so that the storage part guide light L1 can be recognized from the vehicle V positioned outside the storage part even when the entrance door 11 is closed.

For example, the vehicle power supply system 1 and 1A may be achieved using a plurality of parking spaces in a shopping mall or a large scale multiple dwelling complex. In this case, a portion of the parking spaces may be provided with the power supply unit 2 (storage part 10, power supply part 20), etc., for supplying power, and the other parking spaces may be the power supply waiting areas A1 and the power supply-completed areas A3. The recovered heat may be supplied to the shopping mall or the large scale multiple dwelling complex.

Although the heat recovered by the heat pump 3 is described, for example, as being used to heat the building T, the manner in which to use the heat is not limited. For example, the recovered heat may be used to heat water, melt ice, or dry things.

The vehicle V is described above, for example, as recognizing the areas surrounded by the storage part guide light L1, etc., that are emitting light as the areas in which it should stop, and travelling autonomously thereto. However, the manner in which the vehicle V travels autonomously and the manner in which to designate the areas in which the vehicle V should stop are not limited so long as the vehicle V is capable of travelling autonomously to and stopping at predetermined positions such as the position for wireless power supply.

Although the power supply part 20 is described, for example, as wirelessly supplying power to the vehicle V, the power supply part 20 may supply power to the vehicle V by automatically connecting a cable thereto. In this case, for example, a socket is provided on an underside of the vehicle V instead of having the power reception coil part 51, and the power supply part 20 has a plug instead of the power transmission coil part 22. This plug can be moved vertically up and down. Thus, the plug of the power supply part 20 can be inserted into the socket of the vehicle V by raising the plug of the power supply part 20 when the vehicle V arrives and stops at the power supply area P. Consequently, power is supplied from the power supply part 20 to the charging unit 5 of the vehicle V via a wire.

Although the heat pump 3 is described, for example, as the heat supply unit that recovers the heat inside the storage part 10 and supplies the same to the building T, the heat supply unit may have a configuration other than the heat pump 3 so long as the heat supply unit is capable of supplying heat. For example, the heat supply unit may send warmed air (heat) from the storage part 10 to the building T through a duct. In this case, an inlet of the duct installed inside the storage part 10 is the heat recovery part that recovers the heat inside the storage part 10, an outlet of the duct installed in the building T is the heat release part that releases the heat recovered by the heat recovery part to the building T, and the duct serves as the heat transfer mechanism that transfers the heat recovered by the heat recovery part to the heat release part. It should be noted that if the vehicle V is an electric vehicle, no exhaust gas is generated. The heated air inside the storage part 10 thus has the same components as those of the air outside. Consequently, the warmed air inside the storage part 10 can be introduced into an environment in which people reside (building T and the like). The heat supply unit may also heat a heat transfer medium such as water and supply the same to the building T instead of supplying heated air to the building T.

The heat supply unit may also be, for example, a heat pipe that circulates a heat transfer medium to supply heat from the storage part 10 to the building T. In this case, the portion of the heat pipe installed inside the storage part 10 is the heat recovery part that transmits the heat inside the storage part 10 to the heat transfer medium such as oil, the portion of the heat pipe that is installed inside the building T is the heat release part that releases the heat of the heat transfer medium to the building T, and the heat transfer medium that moves between the heat recovery part and the heat release part inside the heat pipe is the heat transfer mechanism. In this case, the heat supply unit is capable of supplying the heat inside the storage part to the building T by transferring the heat transfer medium from the heat recovery part to the heat release part.

Thus, heat inside the storage part 10 can be efficiently recovered and supplied to the building T when a duct or a heat pipe is used as the heat supply unit.

The storage part 10, 10A, or 10B may be provided with a fan to generate a flow of air so that the air heated by the power transmission coil part 22 and the power reception coil part 51 between the bottom surface of the vehicle V and the floor surface R moves in a lateral direction of the vehicle V and escapes through the sides of the vehicle V.

Power may be able to be supplied bidirectionally so that power can be supplied from the battery 53 of the vehicle V in the case of both wireless and wired power supply.

The ceiling and wall surfaces of the storage part 10, 10A, or 10B may, for example, contain ferrite and serve as an electromagnetic shield to reduce the propagation of electromagnetic waves generated during power supply out of the storage part 10, 10A, or 10B.

The power reception coil part 51 need not be provided on the lower surface of the vehicle V so long as power can be wirelessly supplied from the power transmission coil part 22 to the power reception coil part 51 in the power supply area P. For example, the power transmission coil part 22 may be provided raised from the floor surface R and the power reception coil part 51 may be provided on a side surface of the vehicle V so that when the vehicle V stops in the power supply area P, the power transmission coil part 22 and the power reception coil part 51 face each other horizontally.

[Additional Remark] The vehicle power supply system of the present disclosure can contribute to the proliferation of electric vehicles, and thus contributes to Goal 13, "Take urgent action to combat climate change and its impacts," of the Sustainable Development Goals led by the United Nations.

What is claimed is:

1. A vehicle power supply apparatus for supplying power to a vehicle, comprising:
- a storage structure configured to store the vehicle inside thereof;
- a power supply configured to supply power to the vehicle stored inside the storage structure; and
- a heat processing apparatus configured to:
  - recover heat inside the storage structure; and
  - exhaust the heat recovered to outside of the storage structure;
- the storage structure including one or more doorways through which the vehicle enters and/or exits, and a door for opening and closing each respective doorway; and
- a controller configured to control the power supply and the heat processing apparatus;
- wherein:
- the controller controls the heat processing apparatus to recover heat inside the storage structure and exhaust the heat recovered to outside of the storage structure when all of the one or more doorways are closed and the controller is controlling the power supply to supply power to the vehicle stored inside the storage structure;
- the heat processing apparatus includes a heat exhaust coupled to an object outside of the storage structure to be heated such that the heat recovered from supplying power to the vehicle is supplied to the object;
- the heat processing apparatus is a heat pump configured to perform a heat cycle including an evaporation step, a compression step, and a condensation step of a heat transfer medium to transfer heat to the object to be supplied with heat,
- the heat pump includes an evaporator configured to perform the evaporation step of recovering the heat inside the storage structure and evaporating the heat transfer medium,
- the heat pump includes a pipe configured to transfer the heat transfer medium, and a compressor configured to perform the compression step of compressing the heat transfer medium evaporated by the evaporator and raising a temperature of the heat transfer medium, and
- the heat pump includes a condenser configured to perform the condensation step of releasing heat from the heat transfer medium of which the temperature has been raised by the compressor to the object to be supplied with heat and condensing the heat transfer medium.

2. The vehicle power supply apparatus according to claim 1, wherein the heat processing apparatus is a heat pump.

3. The vehicle power supply apparatus according to claim 1, wherein the heat processing apparatus is installed in a position closer to a ceiling of the storage structure than to a floor surface of the storage structure.

4. The vehicle power supply apparatus according to claim 1, wherein the power supply includes a coil configured to wirelessly transmit power to the vehicle installed inside the storage structure.

5. The vehicle power supply apparatus according to claim 1, further comprising:
- a guide light installed inside the storage structure and configured to guide the vehicle; and
- a lighting control configured to control lighting of the guide light,
- wherein the lighting control is configured to turn the guide light on such that the guide light is on when an entrance doorway is open and there is no vehicle inside the storage part, and to turn the guide light off such that the guide light is off when the entrance doorway is closed.

6. The vehicle power supply apparatus according to claim 1, further comprising:
- a temperature sensor configured to measure temperature inside the storage structure; and
- an open-and-close control configured to control opening and closing operations of the door of each respective doorway,
- wherein the open-and-close control is configured to control at least one door to be open when the temperature measured by the temperature sensor is equal to or higher than a predetermined temperature threshold.

7. A vehicle power supply apparatus for supplying power to a vehicle, comprising:
- a storage structure configured to store the vehicle inside thereof;
- a power supply configured to supply power to the vehicle stored inside the storage structure;
- a heat processing apparatus configured to:
  - recover heat inside the storage structure; and
  - exhaust the heat recovered to outside of the storage structure;

wherein the storage structure includes at least one doorway through which the vehicle enters and/or exits, and a door for opening and closing the doorway;

a processor configured to acquire battery state information including a state of an onboard battery from the vehicle inside the storage structure; and a controller configured to control the power supply, the heating apparatus and opening and closing operations of the door, wherein the controller is configured to control the door to be open when the state of the onboard battery indicated by the battery state information acquired by the processor is a predetermined abnormal state.

8. A vehicle power supply apparatus for supplying power to a vehicle, comprising:

a storage structure configured to store the vehicle inside thereof;

a power supply configured to supply power to the vehicle stored inside the storage structure;

a heat processing apparatus configured to:

recover heat inside the storage structure from supplying power to the vehicle; and exhaust the heat recovered to outside of the storage structure;

the heat processing apparatus includes a heat exhaust coupled to an object outside of the storage structure to be heated such that the heat recovered from supplying power to the vehicle is supplied to the object;

a processor configured to generate, when the power supply is to supply power to a plurality of the vehicles in succession, a waiting list of the vehicles waiting to be supplied with power; and a heat processing apparatus control configured to control the heat exhausted by the heat processing apparatus to maintain a supplying state of the exhausted heat to the object to be supplied with heat from the heat processing apparatus when there is a vehicle waiting to be supplied with power in the waiting list.

9. The vehicle power supply apparatus according to claim 8, wherein the heat processing apparatus is a heat pump.

* * * * *